(12) United States Patent
Ishii

(10) Patent No.: US 9,014,570 B2
(45) Date of Patent: Apr. 21, 2015

(54) OPTICAL TRANSMITTER AND METHOD FOR OPTICAL SIGNAL WAVEFORM COMPENSATION

(75) Inventor: Toshio Ishii, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 132 days.

(21) Appl. No.: 13/417,821

(22) Filed: Mar. 12, 2012

(65) Prior Publication Data

US 2012/0251128 A1    Oct. 4, 2012

(30) Foreign Application Priority Data

Mar. 31, 2011    (JP) ................................. 2011-079789

(51) Int. Cl.
*H04B 10/04*    (2006.01)
*H04B 10/12*    (2006.01)
*H04B 10/50*    (2013.01)

(52) U.S. Cl.
CPC ............................... *H04B 10/50593* (2013.01)

(58) Field of Classification Search
CPC ....................... H04B 10/50593; H04B 10/5059
See application file for complete search history.

(56) References Cited

U.S. PATENT DOCUMENTS

| | | | |
|---|---|---|---|
| 5,768,694 A * | 6/1998 | Kumagai | 455/126 |
| 6,583,910 B1 | 6/2003 | Satoh | |
| 7,061,950 B2 | 6/2006 | Hongo et al. | |
| 7,720,392 B2 * | 5/2010 | Nakashima et al. | 398/198 |
| 2003/0058507 A1 * | 3/2003 | Oomori | 359/177 |
| 2007/0159951 A1 * | 7/2007 | Sagara | 369/106 |
| 2007/0195840 A1 * | 8/2007 | Hosking | 372/38.07 |
| 2008/0101795 A1 * | 5/2008 | Schulz et al. | 398/25 |
| 2010/0254715 A1 * | 10/2010 | Yamashita et al. | 398/188 |
| 2012/0288284 A1 * | 11/2012 | Yoshida et al. | 398/186 |

FOREIGN PATENT DOCUMENTS

| | | |
|---|---|---|
| JP | 4-291977 | 10/1992 |
| JP | 11-014951 | 1/1999 |
| JP | 11-305175 | 11/1999 |
| JP | 2003-163639 | 6/2003 |
| JP | 2004-061556 | 2/2004 |
| JP | 2009-168833 | 7/2009 |

OTHER PUBLICATIONS

JPOA—Office Action mailed on Oct. 14, 2014 issued in corresponding Japanese application No. 2011-079789, with partial English language translation.

* cited by examiner

*Primary Examiner* — Shi K Li
*Assistant Examiner* — Mina Shalaby
(74) *Attorney, Agent, or Firm* — Fujitsu Patent Center

(57) ABSTRACT

An optical transmitter includes: a modulator driver to generate a drive signal from an input signal; a modulator to generate a modulated optical signal according to the drive signal; an amplitude detector to detect an input amplitude representative of an amplitude of the input signal; and a controller to generate a waveform control signal according to the input amplitude detected by the amplitude detector. The modulator driver controls a waveform of the drive signal according to the waveform control signal.

10 Claims, 26 Drawing Sheets

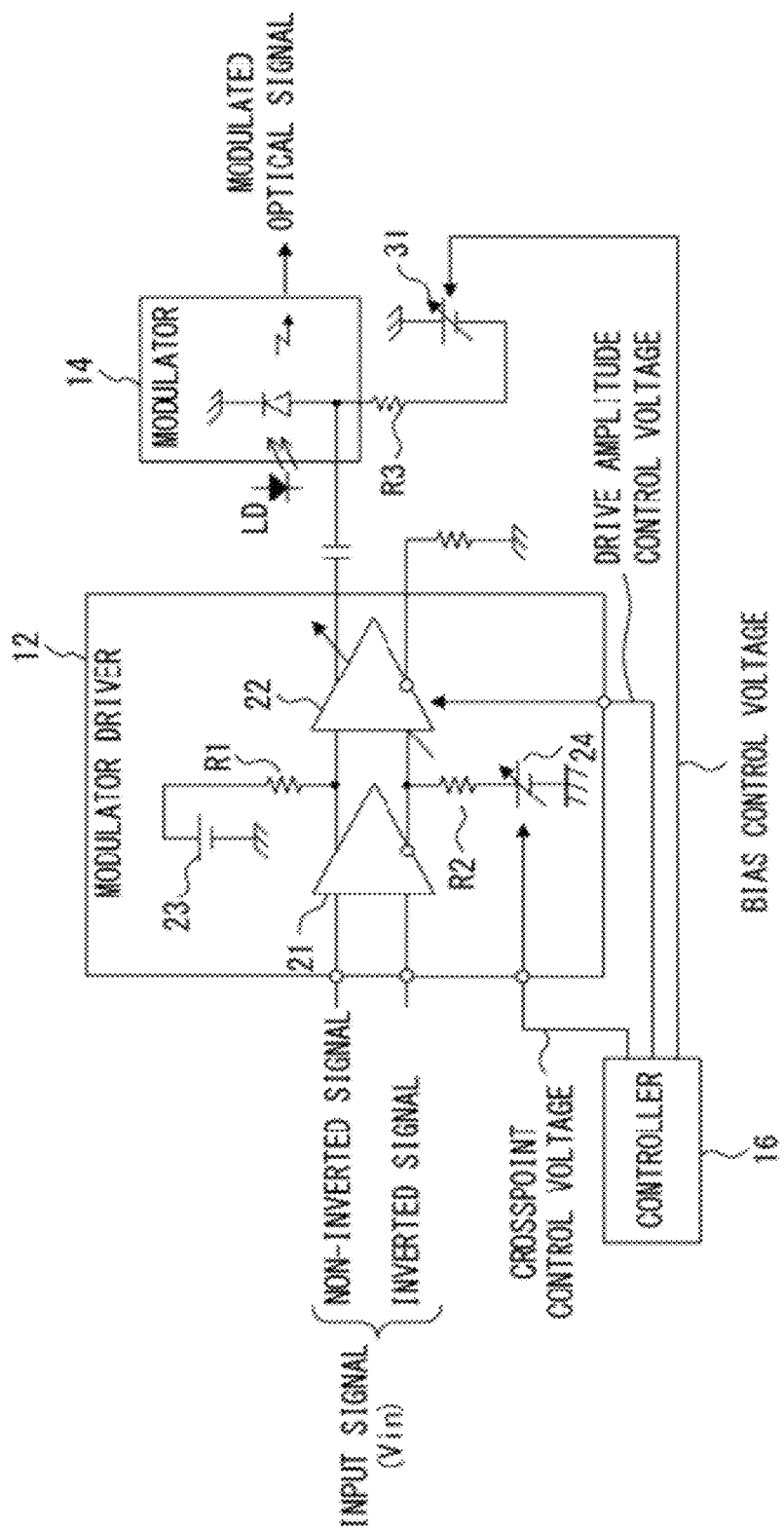
F I G. 3

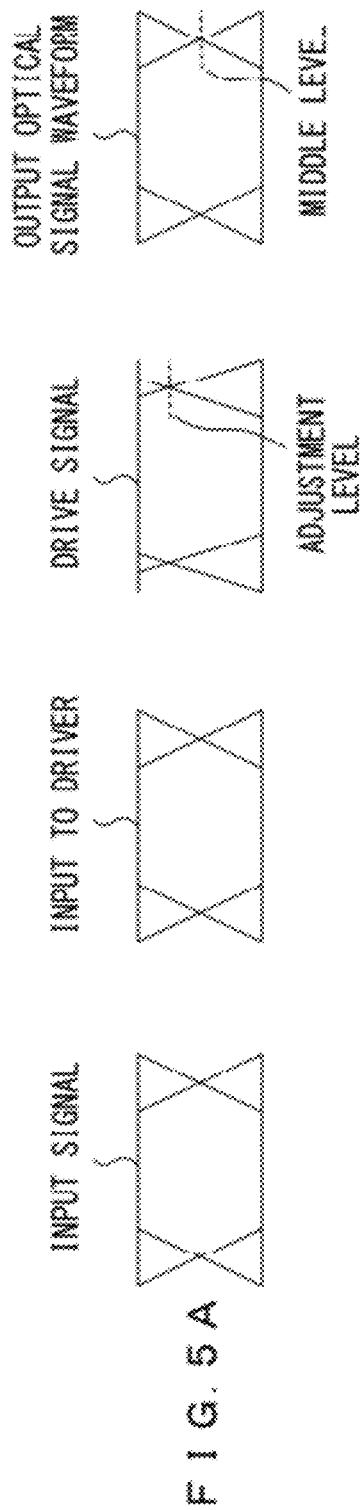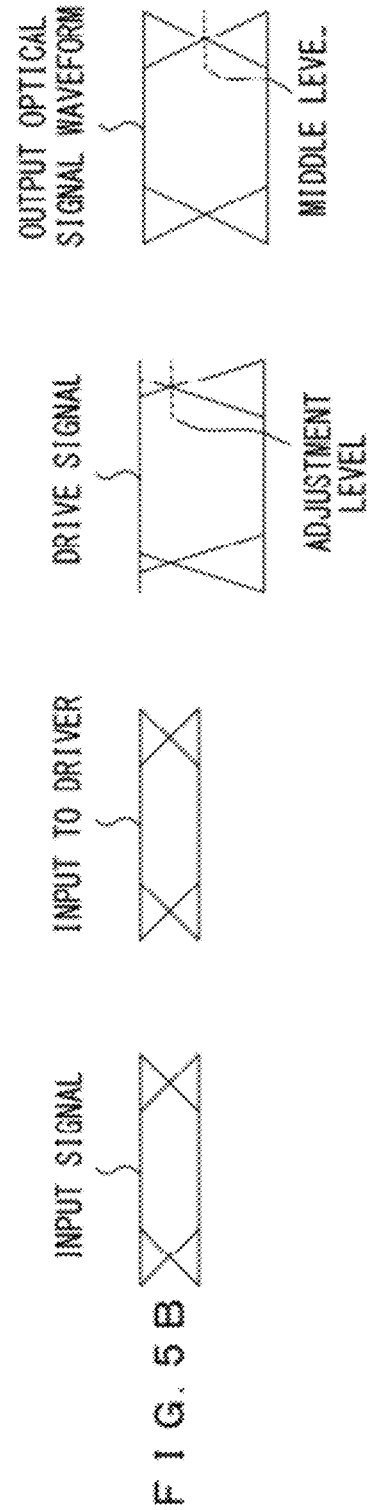
FIG. 5A
FIG. 5B

| Vin | Vdut |
|---|---|
| Vin(1) ~ Vin(2) | Vdut(1) |
| Vin(2) ~ Vin(3) | Vdut(2) |
| Vin(3) ~ Vin(4) | Vdut(3) |
| ⋮ | ⋮ |
| Vin(n-1) ~ Vin(n) | Vdut(n-1) |

F I G. 8

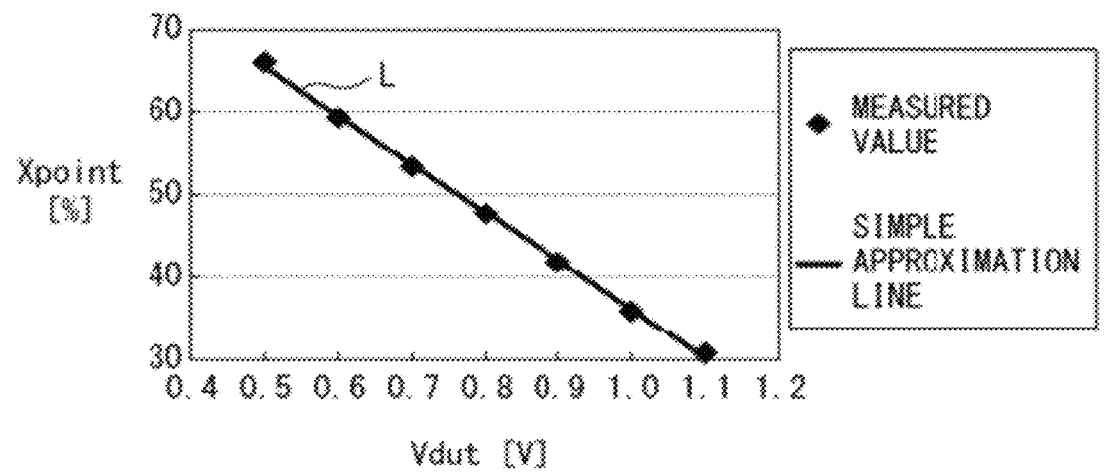
F I G. 16

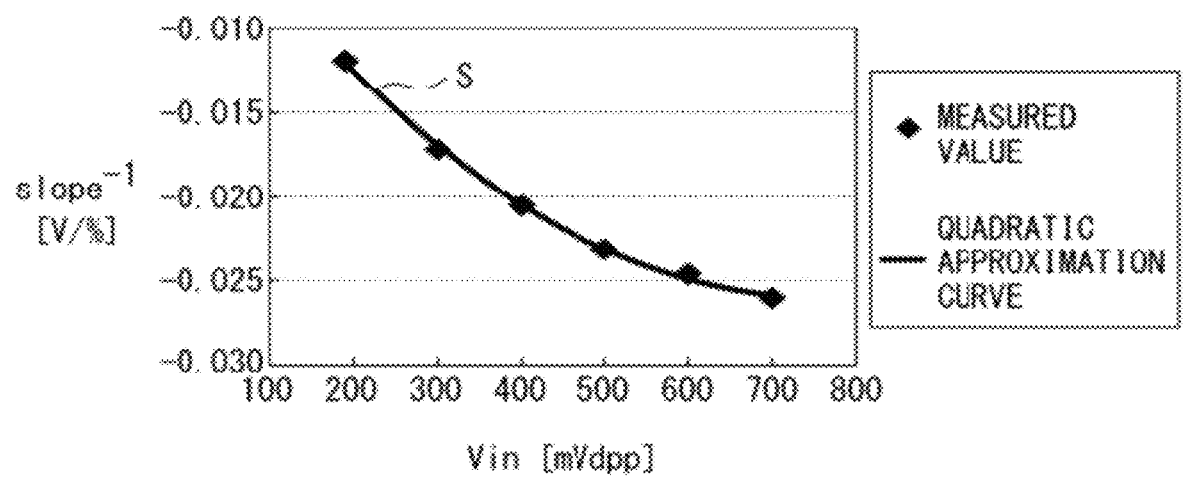
F I G. 18

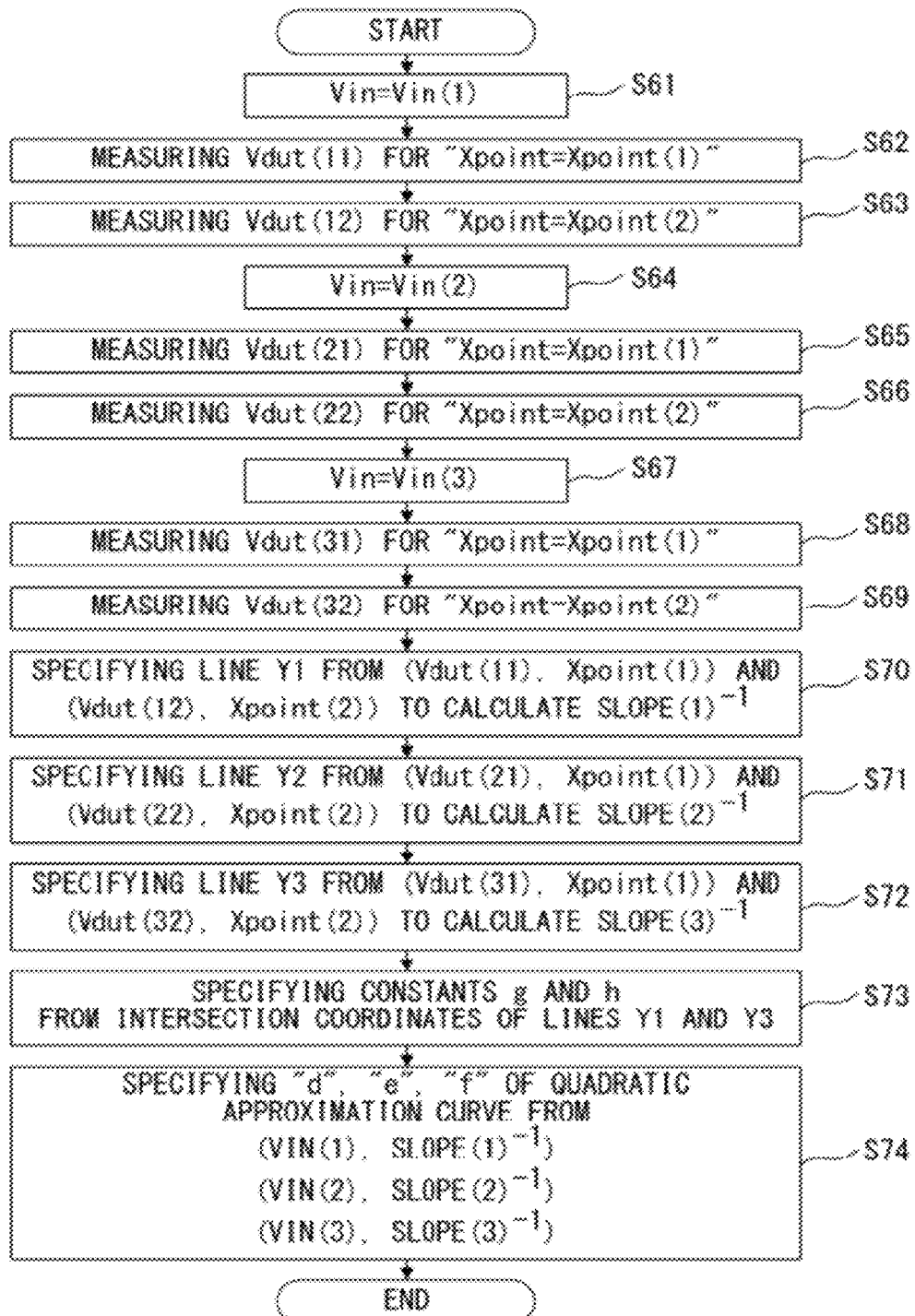
F I G. 19

F I G. 2 2 A
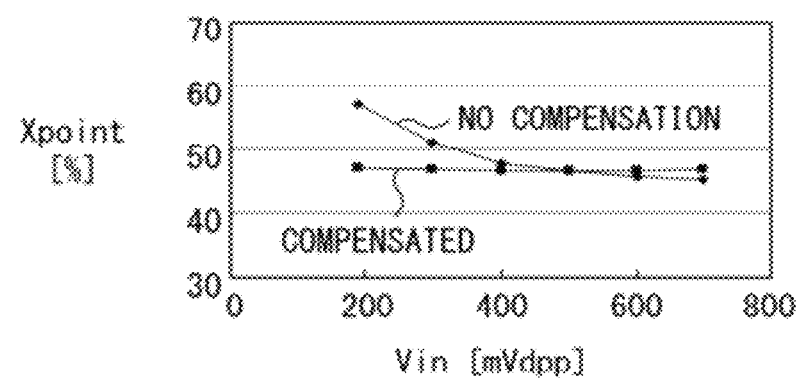
F I G. 2 2 B
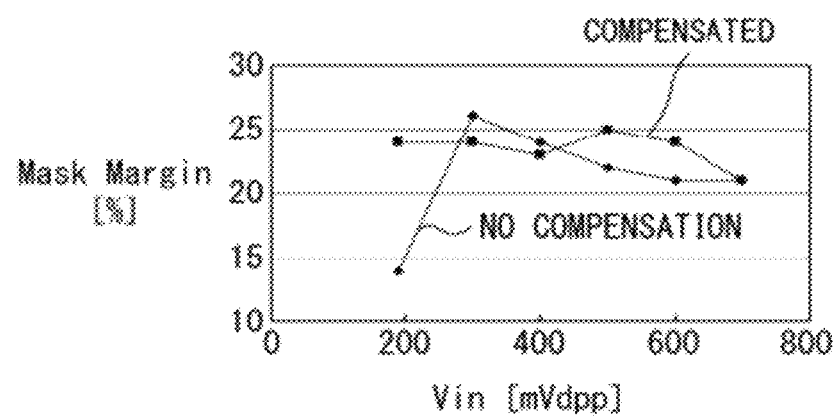

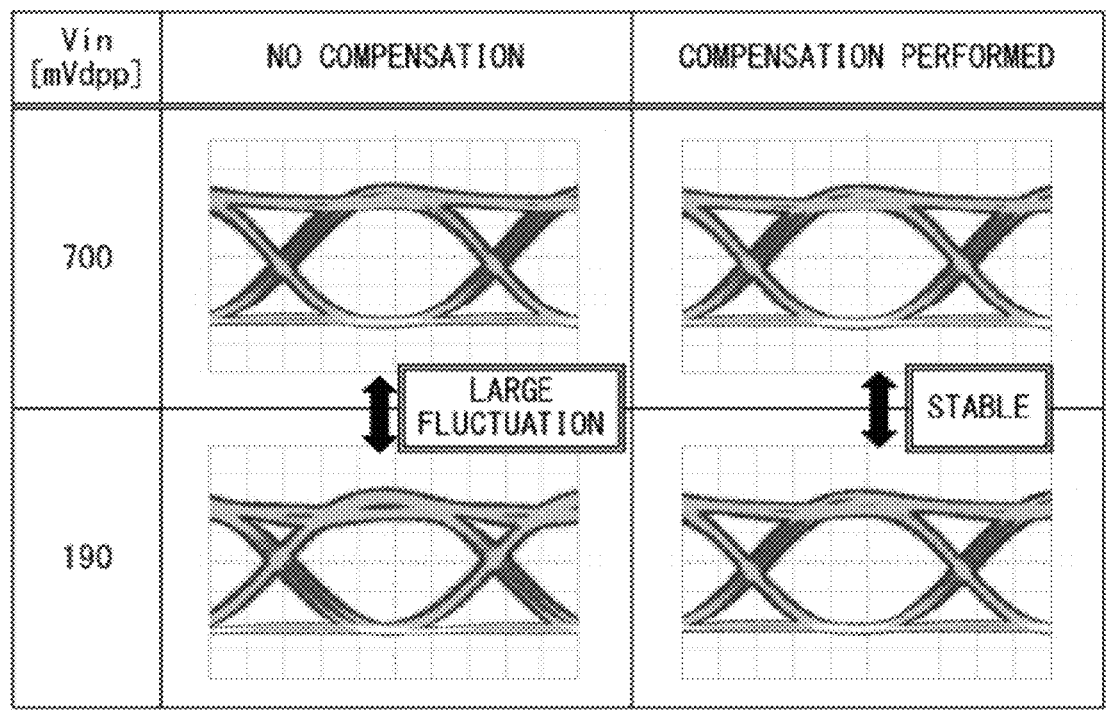
F I G. 2 4

OPTICAL TRANSMITTER AND METHOD FOR OPTICAL SIGNAL WAVEFORM COMPENSATION

CROSS-REFERENCE TO RELATED APPLICATION

This application is based upon and claims the benefit of priority of the prior Japanese Patent Application No. 2011-079789, filed on Mar. 31, 2011, the entire contents of which are incorporated herein by reference.

FIELD

The embodiments described in this application are related to an optical transmitter and a method for optical signal waveform compensation in an optical transmitter.

BACKGROUND

In order to provide high-speed data transmission, optical communication systems have become widespread. In order to achieve increased speed and/or longer distance transmission in the optical communication system, it is important to develop an optical transmitter which generates and transmits an optical signal.

FIG. 1 illustrates an example of an optical transmitter. The optical transmitter 1 includes a modulator driver 2, a light source (LD) 3, and a modulator 4. A data signal is input to the optical transmitter 1 through a signal input terminal. The modulator driver 2 generates a drive signal from the input data signal. At this time, the modulator driver 2 generates the drive signal according to a control signal and/or control voltage. The light source 3 is a direct-current laser light source, and generates CW (Continuous Wave) light. The modulator 4 modulates the CW light with the drive signal generated by the modulator driver 2 to generate a modulated optical signal.

In order to achieve the long distance transmission of an optical communication system, the output optical signal waveform of the optical transmitter 1 is appropriately shaped. For example, the control voltage and/or control signal given to the modulator driver 2 is set so as to satisfy the demand for an output optical signal waveform such as a crosspoint, an extinction ratio, or a pulse mask.

However, the output optical signal waveform is largely dependent on the waveform of the input signal to the optical transmitter 1. For example, when the amplitude of the input data signal to the optical transmitter 1 fluctuates, it is not easy to provide sufficient tolerance for fluctuations so as to satisfy the demand for the output optical signal waveform. For this reason, the optical transmitter 1 may include an interface circuit 5 between the signal input terminal and the modulator driver 2 to compensate for the fluctuations in the amplitude of the input signal, as necessary.

As a technique related to the present application, an optical transmitter has been proposed that is capable of obtaining, in the optical output, an optimal amount of fluctuation in the optical frequency without causing a deterioration of the optical output power or the output optical signal waveform. This optical transmitter includes a light source, an electroabsorption optical modulator (EA modulator) which absorbs the input light according to the applied voltage, an optical modulator driver, a bias circuit, an optical coupler which branches the optical output, an optical frequency fluctuation monitor having an optical frequency discriminator and a peak detector, and a controller. The drive condition of the optical modulator is adjusted such that the amount of fluctuations in optical frequency will be optimized (for example, see Japanese Laid-open Patent Publication No. 11-305175).

Moreover, as another related technique, the following optical modulator driver has been proposed. The optical modulator driver has resistors respectively at the sources of two transistors which configure a differential circuit with first and second input ports. At least one of the resistors is variable, and different values of resistance are set to a pair of differentials. The optical modulator is driven in the state where the crosspoint of eye patterns is shifted away from the center (for example, see Japanese Laid-open Patent Publication No. 11-014951).

Further, in Japanese Laid-open Patent Publication No. 2009-168833 and Japanese Laid-open Patent Publication No. 2004-061556, other related techniques are disclosed.

In recent years, there has been an increasing demand for the reduction in size and power consumption in optical modules (including optical transmitters). For this reason, in the optical transmitter 1 of FIG. 1, a configuration in which the interface circuit 5 is not implemented is desired. However, in the configuration in which the interface circuit 5 is not implemented, as described above, the output optical signal waveform may deteriorate when the amplitude of the input data signal fluctuates.

SUMMARY

According to an aspect of the invention, an optical transmitter includes: a modulator driver to generate a drive signal from an input signal; a modulator to generate a modulated optical signal according to the drive signal; an amplitude detector to detect an input amplitude representative of an amplitude of the input signal; and a controller to generate a waveform control signal according to the input amplitude detected by the amplitude detector, wherein the modulator driver controls a waveform of the drive signal according to the waveform control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a modulator driver, a modulator, and their peripheral circuits.

FIGS. 5A and 5B are diagrams illustrating the operation of an optical transmitter according to an embodiment.

FIG. 8 illustrates an example of a crosspoint control voltage table.

FIG. 16 is a diagram illustrating the relationship between the crosspoint control voltage and a position of the crosspoint of the output optical signal waveform.

FIG. 18 is a diagram illustrating $slope^{-1}$ against the input amplitude Vin.

FIG. 19 is a flowchart illustrating a method for determining a function used in the third embodiment.

FIGS. 22A, 22B, and 23A-23C illustrate measurement results.

FIG. 24 is a diagram illustrating the output optical signal waveform obtained by measurement.

DESCRIPTION OF EMBODIMENTS

Figure 2:
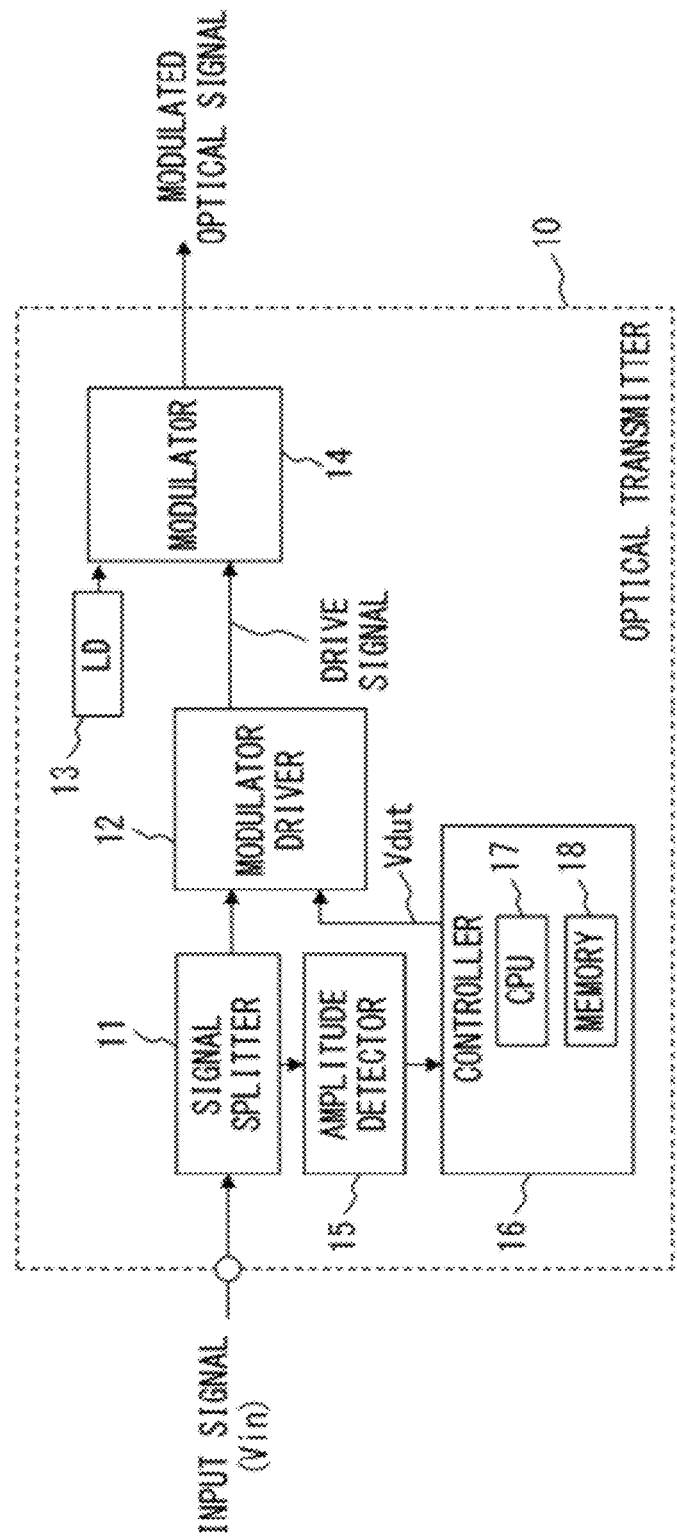
FIG. 2 is a diagram illustrating the configuration of an optical transmitter according to an embodiment.

FIG. 2 illustrates the configuration of an optical transmitter according to an embodiment. An optical transmitter 10 according to an embodiment includes a signal splitter 11, a modulator driver 12, a light source (LD) 13, a modulator 14, an amplitude detector 15, and a controller 16, as illustrated in FIG. 2.

An input signal to the optical transmitter 10 is, for example, a data signal. In the following descriptions, the input signal to the optical transmitter 10 may be referred to as a data signal. Moreover, the input signal may be, for example, a signal which transmits data at a high speed that is equal to or faster than 1 Gbit/s. The form of input signals is not particularly limited, but may be, for example, ECL (Emitter-Coupled Logic), TTL (Transistor-transistor Logic), or XFI (10G electrical interface to the XFP module). Further, in the present embodiment, the input signal is a differential signal. In other words, a pair of signals in which the logic is inverted with respect to each other is input to the optical transmitter 10. In the following descriptions, one of the pair of signals may be referred to as a "non-inverted sgnal (normal signal)", and the other one of the pair of signals may be referred to as "inverted signal".

The signal splitter 11 splits a signal input through a signal input terminal (that is, the input signal), and the split signals are guided to the modulator driver 12 and the amplitude detector 15. The signal splitter 11 will be described later in detail.

The modulator driver 12 generates a drive signal from the input signal. At this time, the modulator driver 12 generates a drive signal according to one or more control signals. The drive signal is a voltage signal representative of the input signal (or, a voltage signal corresponding to the input signal).

The light source (LD) 13 is a direct-current laser light source, and generates CW (Continuous Wave) light. The modulator 14 modulates the CW light with the drive signal generated by the modulator driver 12 to generate a modulated optical signal. In the present embodiment, the modulator 14 is an electroabsorption optical modulator (EA modulator). An EA modulator absorbs the input light depending on the applied voltage. Accordingly, the modulator 14 generates an optical signal which varies depending on the voltage level of the drive signal. In other words, the modulator 14 generates a modulated optical signal which indicates the input data signal.

The amplitude detector 15 detects the amplitude of the input signal by using the branched input signal guided from the signal splitter 11. In the following descriptions, the amplitude of the input signal to the optical transmitter 10 will be referred to as "input amplitude". The amplitude detector 15 will be described later in detail.

The controller 16 generates a waveform control signal according to the input amplitude detected by the amplitude detector 15. Then, the modulator driver 12 controls the waveform of the drive signal according to the waveform control signal. In the present embodiment, the waveform control signal is a crosspoint control voltage which controls the position of the crosspoints of the drive signal. In this case, the modulator driver 12 controls the position of the crosspoints of the drive signal according to the crosspoint control voltage. Note that a crosspoint represents an intersection point (or the position of the intersection point) of a rising edge and a falling edge of a signal waveform (or an eye pattern of the signal).

The controller 16 may generate a drive amplitude control voltage and a bias control voltage in addition to the waveform control signal (here, it is a crosspoint control voltage). The drive amplitude control voltage controls the amplitude of the drive signal. In other words, the modulator driver 12 controls the amplitude of the drive signal according to the drive amplitude control voltage. At this time, the controller 16 may generate the drive signal control voltage such that, for example, the amplitude of the drive signal will be at a constant level in the feedback control. The bias control voltage controls the bias of the modulator 14. In other words, the modulator 14 generates a modulated optical signal under the control of the bias control voltage. At this time, the controller 16 may generate an adequate bias control voltage while monitoring the modulated optical signal output from the modulator 14.

The controller 16 according to the present embodiment has a CPU 17 and memory 18. The memory 18 may be configured to include a ROM region and a RAM region. In this case, an amplitude value detected by the amplitude controller 15 is converted into digital data by an A/D converter (not illustrated in FIG. 2) and input to the controller 16. Moreover, the CPU 17 executes a control program stored in the memory 18 to generate crosspoint control voltage data, drive amplitude control voltage data, and bias control voltage data. Then, the controller 16 generates crosspoint control voltage, drive amplitude control voltage, and bias control voltage according to the crosspoint control voltage data, drive amplitude control voltage data, and bias control voltage data, respectively. Alternatively, a voltage generator (not illustrated in FIG. 2) may generate crosspoint control voltage, drive amplitude control voltage, and bias control voltage according to the instructions from the controller 16. Note that the crosspoint control voltage is an example of a waveform control signal. The waveform control signal is used by the modulator driver 12 in order to control a waveform of the drive signal. The drive amplitude control voltage may also be an example of a waveform control signal.

FIG. 3 is a diagram illustrating an example of the modulator driver 12, the modulator 14, and their peripheral circuits. In the present example, the input signal is a differential signal.

The modulator driver 12 has an amplifier 21 and a variable amplifier 22. The amplifier 21 amplifies an input signal. In other words, the amplifier 21 amplifies a non-inverted signal and an inverted signal, respectively. The variable amplifier 22 further amplifies the output signal of the amplifier 21. In other words, the variable amplifier 22 further amplifies the non-inverted signal and inverted signal output from the amplifier 21, respectively. The output amplitude of the variable amplifier 22 is controlled by the drive amplitude control voltage which is generated by the controller 16.

The non-inverted signal is maintained at a constant voltage level by using a constant-voltage source 23 and a resistor R1. In contrast, the voltage level of the inverted signal is adjusted by using a variable-voltage source 24 and a resistor R2. Here, the voltage generated by the variable-voltage source 24 is controlled by the crosspoint control voltage. In other words, the voltage level of the inverted signal is controlled by the crosspoint control voltage.

The operation of changing the voltage level of the inverted signal relative to the non-inverted signal corresponds to the operation of adjusting the inter-differential offset of a differential signal (offset between a pair of signals in the voltage level). Then, by adjusting the inter-differential offset, the crosspoints of an output signal (i.e., a drive signal) are adjusted. In other words, the crosspoints of the drive signal are controlled by adjusting an inter-differential offset by using the crosspoint control voltage.

In the example of FIG. 3, the voltage level of the inverted signal is adjusted by using the crosspoint control voltage. However, the modulator driver 12 may adjust the voltage level of the non-inverted signal by using the crosspoint control voltage. Moreover, the control of the crosspoints of the drive signal is not limited to the configuration in which the inter-differential offset is adjusted. Further, the modulator driver 12 may be configured to further include one or more amplifiers in addition to the amplifier 21 and the variable amplifier 22.

The non-inverted signal output from the modulator driver 12 is given to the modulator 14 as a drive signal. Between the modulator driver 12 and the modulator 14, for example, a capacitor is provided in order to remove the DC component of the drive signal. Note that in the present example, the inverted signal amplified by the variable amplifier 22 is not guided to the modulator 14.

The modulator 14 modulates the CW light with the drive signal generated by the modulator driver 12 to generate a modulated optical signal. The CW light is generated by the light source (LD) 13. A variable-voltage source 31 and a resistor R3 are provided to control the bias of the modulator 14. The voltage generated by the variable-voltage source 31 is controlled by the bias control voltage. In other words, the controller 16 can control the bias of the modulator 14 by using the bias control voltage.

In order to achieve a long-distance transmission by the optical transmitter 10 above, it is preferred that the output optical signal waveform be appropriately shaped. In other words, it is preferred that, for example, characteristics such as the crosspoints of the output optical signal waveform, the extinction ratio, and the pulse mask be optimized or approximately optimized.

Figure 4A:
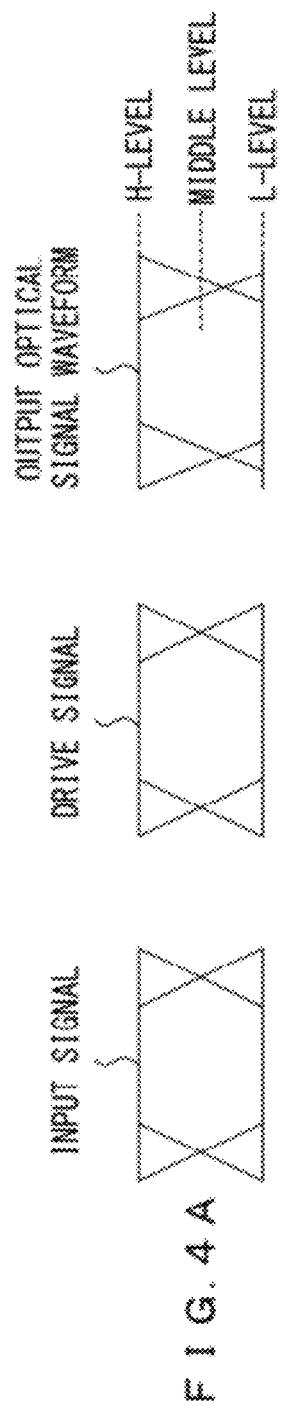
FIGS. 4A-4C are diagrams illustrating the characteristics of a modulator.
Figure 4B:
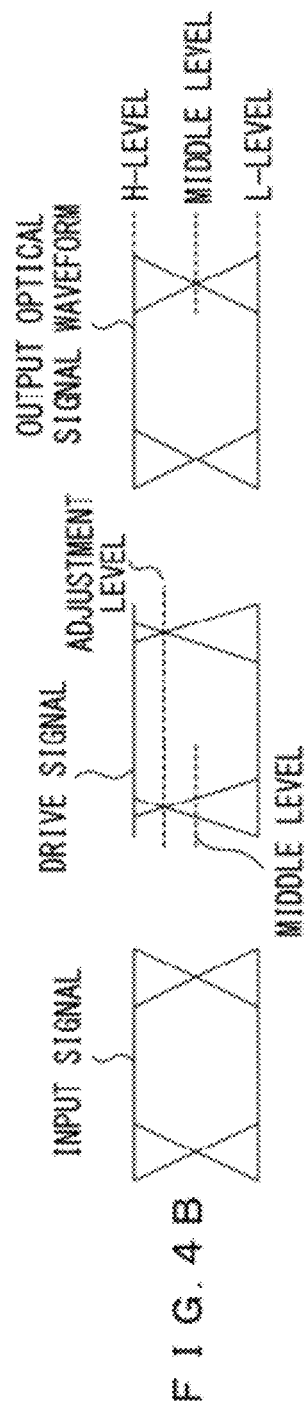
Figure 4C:
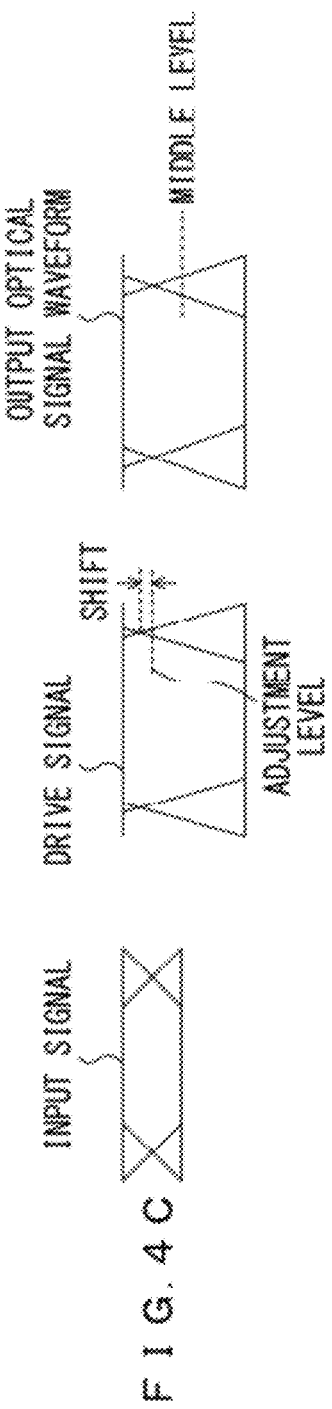

FIGS. 4A-4C are diagrams illustrating the characteristics of the modulator 14. Here, it is assumed that the modulator 14 is an EA modulator.

The optical output power of an EA modulator has a non-linear characteristic with respect to the applied voltage. For this reason, when the duty cycle of the drive signal of an EA modulator is 50 percent, the width of the output optical signal waveform at an H-level is narrower than the width at an L-level. In this case, the crosspoints of the output optical signal waveform shift to an L-level side, as illustrated in FIG. 4A.

Accordingly, the modulator driver generates a drive signal such that the crosspoints of the output optical signal waveform will be obtained at the middle of the H-level and L-level (hereinafter, moddle level). In other words, the modulator driver generates a drive signal which has crosspoints at a higher adjustment level than the middle level such that the crosspoints of the output optical signal waveform will be obtained at the middle level, as illustrated in FIG. 4B. At this time, the modulator driver controls the position of the crosspoints of the drive signal according to the above-mentioned crosspoint control voltage. In the configuration illustrated in FIG. 2 or FIG. 3, the controller 16 generates the crosspoint control voltage such that the crosspoints of the output optical signal waveform will be arranged at the middle level. By so doing, an EA modulator generates a modulated optical signal which has the crosspoints at the middle level.

The amplitude of the input signal to an optical transmitter (hereinafter, input amplitude) may vary depending on various factors. For example, FIG. 4C illustrates an example of the drive signal waveform and output optical signal waveform in a case where the input amplitude is smaller than that of FIG. 4B. In this case, the modulator driver controls the amplitude of a drive signal at an approximately constant level, and a specified extinction ratio is obtained.

However, if the input amplitude varies without controlling the crosspoint control voltage, the crosspoints of the drive signal are shifted from the adjustment level, as illustrated in FIG. 4C. Accordingly, the crosspoints of the output optical signal waveform are shifted from the middle level.

As described above, when the input amplitude fluctuates, the crosspoints of the output optical signal waveform are shifted from the middle level. Accordingly, the optical transmitter 10 according to an embodiment controls the crosspoint control voltage based on the input amplitude.

FIGS. 5A and 5B are diagrams illustrating the operation of the optical transmitter 10 according to an embodiment. As illustrated in FIG. 2, the optical transmitter 10 has the signal splitter 11 on an input side of the modulator driver 12. The signal splitter 11 splits an input signal and guides the spilt signals to the modulator driver 12 and the amplitude detector 15. However, it is assumed that the signal splitter 11 has substantially no influence on a signal which is guided from a signal input terminal to the modulator driver 12. In other words, the amplitude of the input signal to the modulator driver 12 is approximately the same as the input amplitude of the optical transmitter 10.

In the optical transmitter 10 according to an embodiment, the controller 16 generates crosspoint control voltage according to the input amplitude. In other words, the controller 16 generates the crosspoint control voltage such that the crosspoints of the drive signal will always be arranged approximately at the adjustment level, even when the input amplitude fluctuates.

The modulator driver 12 generates a drive signal according to the crosspoint control voltage given by the controller 16. In other words, as illustrated in FIGS. 5A and 5B, even when the input amplitude of the optical transmitter 10 fluctuates, approximately the same drive signal is generated. For example, when the input amplitude of the optical transmitter 10 fluctuates, a drive signal is generated such that the amplitude of the drive signal will be at a constant level, and the position of the crosspoints of the drive signal will be arranged at the adjustment level of FIG. 4B. Accordingly, even when the input amplitude of the optical transmitter 10 fluctuates, the modulator 14 can always generate a modulated optical signal which has a favorable optical signal waveform.

Figure 1:
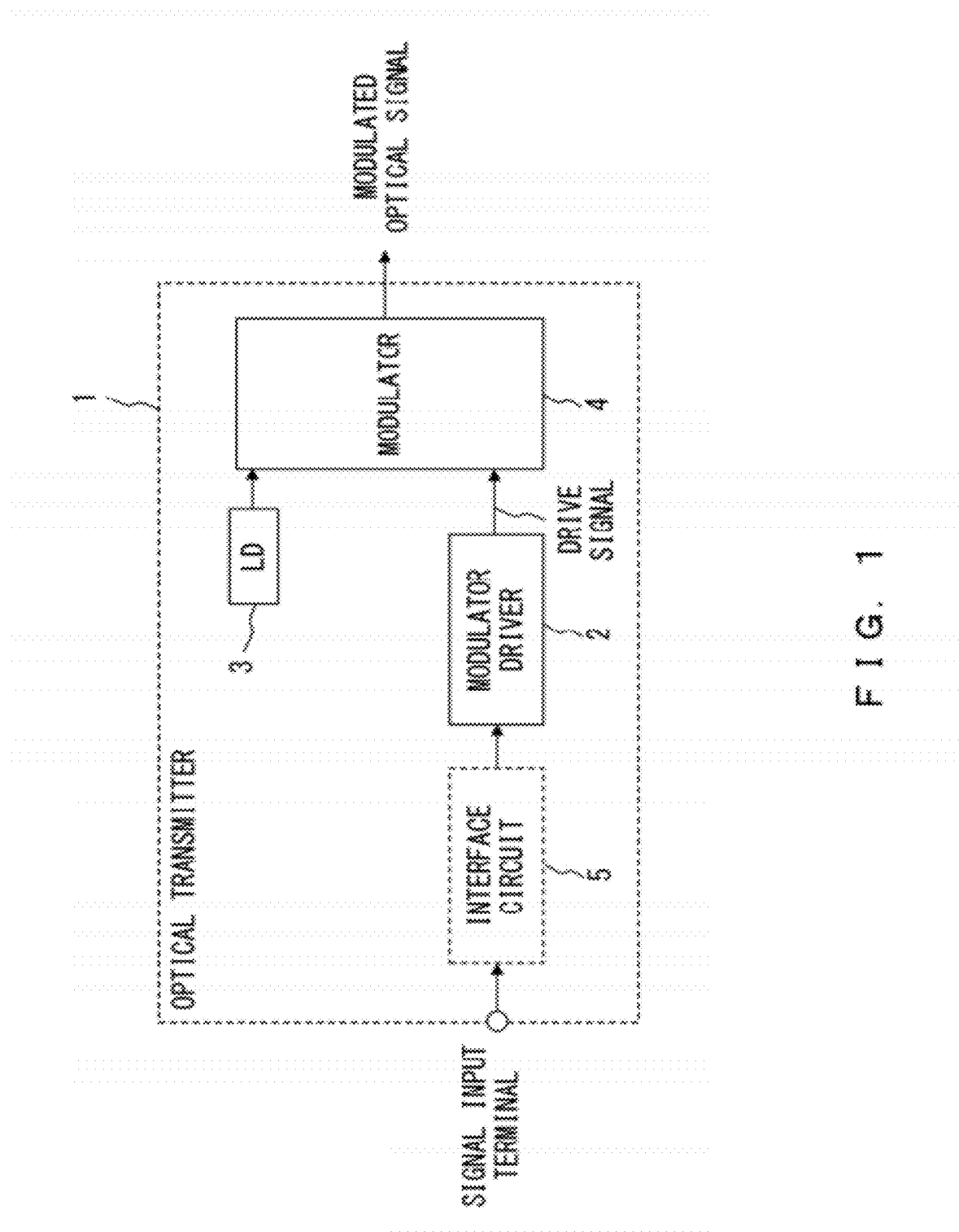
FIG. 1 is a diagram illustrating an example of an optical transmitter.

As described above, the optical transmitter 10 according to an embodiment can compensate or approximately compensate for the fluctuations in the input amplitude without providing an interface circuit which adjusts the input amplitude (for example, interface circuit 5 of FIG. 1) on the input side of the modulator driver 12. Hence, according to the configuration of an embodiment, a reduction in size and power consumption of the optical transmitter 10 is achieved.

Figure 6:
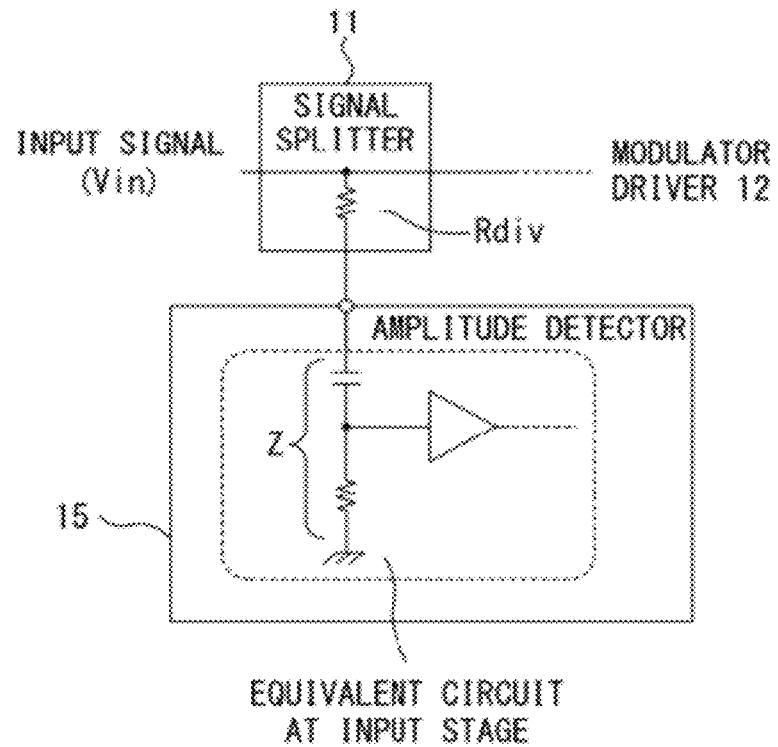
FIG. 6 is a diagram illustrating a signal splitter.

FIG. 6 is a diagram illustrating the signal splitter 11. It is preferred that the signal splitter 11 satisfy the following requirements.

(1) Exerting no influence on the high-frequency matching of a signal line between the signal input terminal and the modulator driver 12
(2) Preventing the reduction in amplitude of the signal to be input to the modulator driver 12 as much as possible
(3) Sufficiently attenuating the reflected wave when there is a reflection from the amplitude detector 15
(4) Transmitting the information of the input amplitude to the amplitude detector 15

The amplitude detector 15 is provided to detect the input amplitude, and the amplitude detector 15 may not detect the code information of the input signal (i.e., the values of each bit). For this reason, the signal splitter 11 is adequate as long as the signal guided to the amplitude detector 15 satisfies the minimum sensitivity of an input amplitude of the amplitude detector 15 and has an impedance satisfying the requirements of (1)-(3) above. Thus, the signal splitter 11 does not require a complex configuration like a coaxial distributor, and may be realized by, for example, one resistor element. In this case, if the signal splitter 11 is realized by a single chip resistor, there is a decrease in footprint.

For example, a resistor Rdiv which realizes the signal splitter 11 is designed as follows. Here, it is assumed that the total inner impedance of the amplitude detector 15 at the input stage is "Z". Moreover, it is assumed that the minimum sensitivity of input amplitude of the amplitude detector 15 is "Vsens". Furthermore, it is assumed that the minimum amplitude of the input signal to the signal splitter 11 is "Vin(min)". In this case, the resistor Rdiv is designed so as to satisfy the requirements of (1)-(3) above and the equation below.

$$Vin(min) \cdot Z/(Rdiv+Z) > Vsens$$

Figure 7A:
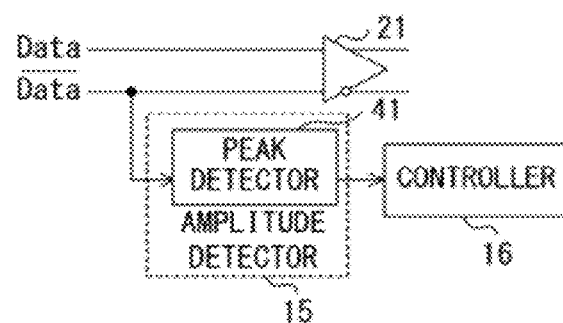
FIGS. 7A-7C are diagrams illustrating an amplitude detector.
Figure 7B:
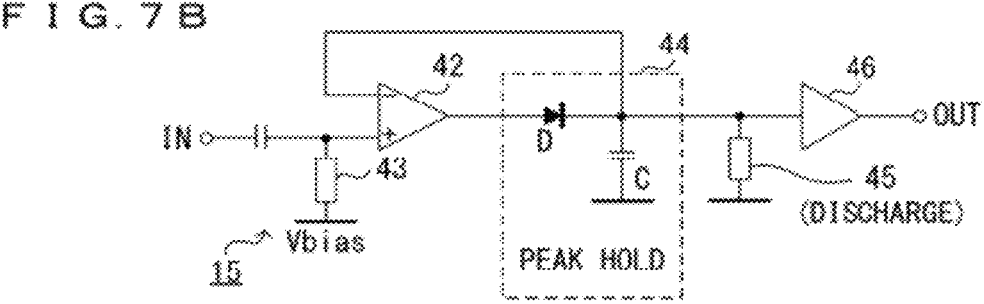
Figure 7C:
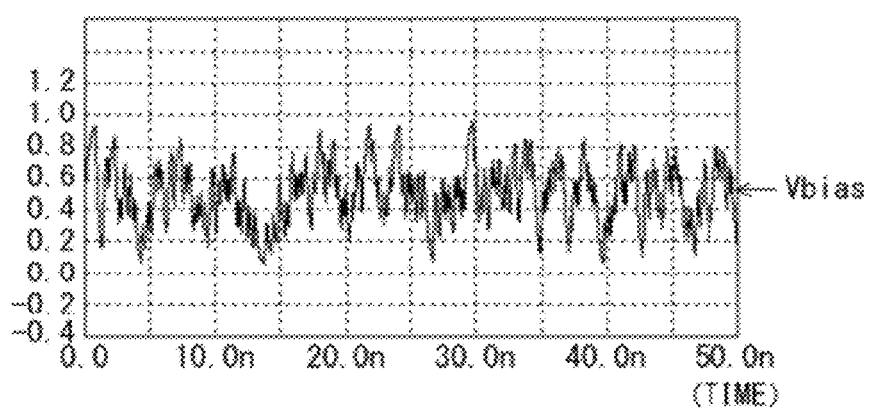

FIGS. 7A-7C are diagrams illustrating the amplitude detector 15. For example, the amplitude detector 15 is realized by using a peak detector 41 as illustrated in FIG. 7A. The peak detector 41 detects the peak on an H-side or the peak on an L-side of the input signal. Here, the input data signal is a differential signal, and includes a non-inverted signal and an inverted signal. In the present example, the amplitude detector 15 detects the amplitude of an inverted signal. In this case, the signal splitter 11 may be configured to guide only the inverted signal to the amplitude detector 15. In the differential signal, the amplitude of the non-inverted signal is substantially the same as that of the inverted signal.

FIG. 7B illustrates an example of the amplitude detector 15. To the amplitude detector 15, for example, an inverted signal is input, as illustrated in FIG. 7A. The input signal is guided to the non-inverting terminal of the buffer amplifier 42 after its DC component is removed by a capacitor. To the non-inverting terminal of the buffer amplifier 42, specified bias voltage Vbias is given by a bias circuit 43. To the inverting terminal of the buffer amplifier 42, the potential held by a peak hold circuit 44 is given.

The peak hold circuit 44 includes a diode D and a capacitor C. The output signal from the buffer amplifier 42 is guided to the anode of the diode D. The cathode of the diode D is electrically connected to the capacitor C. The potential held by the capacitor C is given to the inverting terminal of the buffer amplifier 42.

On the output side of the peak hold circuit 44, a discharger 45 is provided. The discharger 45 discharges the capacitor C at a constant rate. A voltage follower 46 outputs a signal representative of the potential held by the peak hold circuit 44.

FIG. 7C illustrates an example of the input signal to the non-inverting terminal of the buffer amplifier 42. If bias voltage Vbias is appropriately given, the peak on an H-side of the input signal passes through the diode D. Then, the electric charge that has passed through the diode D is accumulated in the capacitor C. Accordingly, the voltage held by the peak hold circuit 44 represents an average of the peak voltage of the input signal. Here, the pattern of the input signal is substantially random. Accordingly, the average of the peak voltage of the input signal substantially represents the amplitude of the input signal. Then, the input amplitude detected by the amplitude detector 15 is given to the controller 16.

The configuration illustrated in FIG. 7B is just an example, and the amplitude detector 15 may be realized by a different configuration. For example, it is not always necessary for the amplitude detector 15 to include the peak hold circuit 44.

Moreover, the amplitude detector 15 is provided to detect the input amplitude, and may not detect the code information of the input signal (i.e., the values of each bit). For this reason, the operating speed of the amplitude detector 15 may be slower than the speed of the input data signal. Hence, the amplitude detector 15 may be realized by using an inexpensive element in which the detection band is narrow.

First Embodiment

In the first embodiment, the crosspoint control voltage with which the modulator 14 can obtain a desired output optical signal waveform is specified in advance for input amplitude. The controller 16 generates the crosspoint control voltage which corresponds to the input amplitude Vin detected by the amplitude detector 15. The correspondence between the input amplitude Vin and the crosspoint control voltage is stored in a crosspoint control voltage table.

FIG. 8 illustrates an example of the crosspoint control voltage table. In the crosspoint control voltage table, crosspoint control voltage data Vdut is stored in a plurality of corresponding input amplitude sections. In the example of FIG. 8, the input amplitude Vin(1)–Vin(n) is divided into n–1 sections. "Vin(1)" indicates the minimum value of the input amplitude, and "Vin(n)" indicates the maximum value of the input amplitude.

When the input amplitude is between Vin(1)–Vin(2), "Vdut(1)" represents the crosspoint control voltage with which the modulator 14 can obtain a desired output optical signal waveform. The "desired optical signal waveform" is not specifically limited, but is, for example, an optical signal waveform having the crosspoints approximately at the middle of the H-level and L-level. When the input amplitude is between Vin(2)–Vin(3), "Vdut(2)" represents the crosspoint control voltage with which the modulator 14 can obtain a desired output optical signal waveform. Similarly, "Vdut(3)-Vdut(n-1)" are stored for corresponding input amplitude sections.

Figure 9:
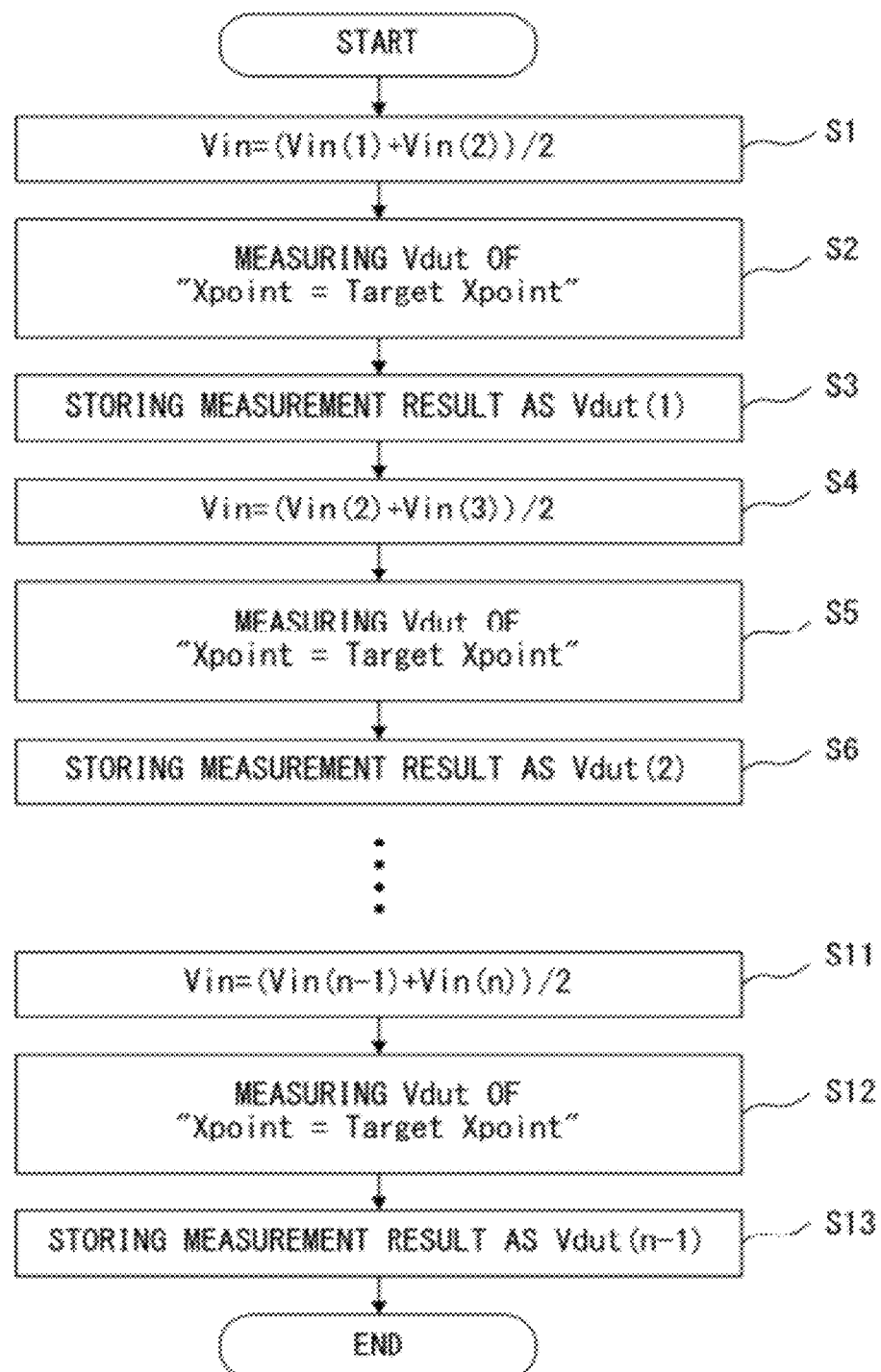
FIG. 9 is a flowchart illustrating a method for creating a crosspoint control voltage table.

FIG. 9 is a flowchart illustrating a method for creating a crosspoint control voltage table. The procedure of the flowchart is performed, for example, by a measurement system. Alternatively, a user may manually perform the procedure. In the following descriptions, it is assumed that a measurement system performs the procedure of FIG. 9. In this case, the measurement system includes, for example, a variable-amplitude signal generator, a monitor device which measures the waveform of the modulated optical signal output from the optical transmitter 10, and a measurement controller. The measurement controller has the function of controlling the amplitude of the signal generated by the variable-amplitude signal generator, the function of providing an instruction to the controller 16 according to the output from the monitor device, or the like.

Figure 10A:
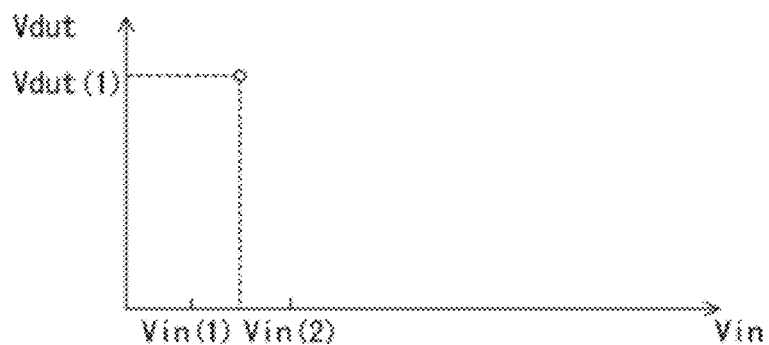
FIGS. 10A-10C are diagrams illustrating the procedure for measuring the crosspoint control voltage which corresponds to the input amplitude.

In S1, the measurement system inputs the data signal in which "input amplitude=(Vin(1)+Vin(2))/2" is applicable to the optical transmitter 10. In S2, the measurement system measures a value of the crosspoint control voltage with which the crosspoints of the modulated optical signal output from the modulator 14 are optimized, while sweeping the crosspoint control voltage Vdut. An "optimized state" corresponds to, for example, a state in which the crosspoints of the modulated optical signal are approximately at the middle of the H-level and L-level of the modulated optical signal. In FIG. 9, "Xpoint" represents the position of the crosspoints of the modulated optical signal which is output from the modulator 14. Moreover, "target Xpoint" represents the target position of the crosspoints of the modulated optical signal. In S3, the measurement system stores the Vdut obtained in S2 in memory area 1 as Vdut(1). In other words, the Vdut(1) illustrated in FIG. 10A is detected and stored in the memory area 1 in the crosspoint control voltage table.

Figure 10B:
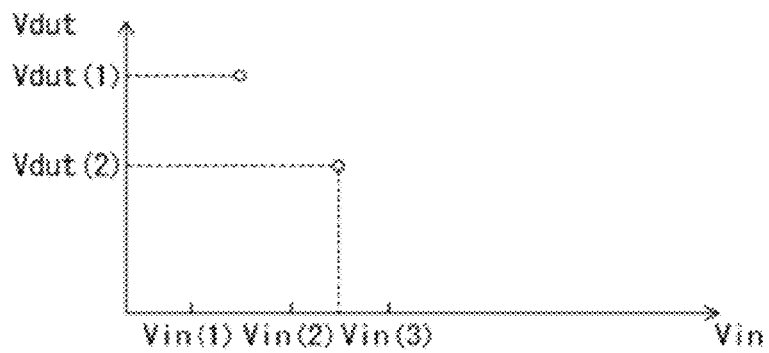

The processes of S4-S6 are similar to those of S1-S3. However, in S4-S6, the measurement system inputs the data signal in which "input amplitude=(Vin(2)+Vin(3))/2" is applicable to the optical transmitter 10. Moreover, the measurement system stores in memory area 2 the crosspoint control voltage Vdut obtained for the data signal as Vdut(2). In other words, the Vdut(2) illustrated in FIG. 10B is detected and stored in the memory area 2 of the crosspoint control voltage table.

Figure 10C:
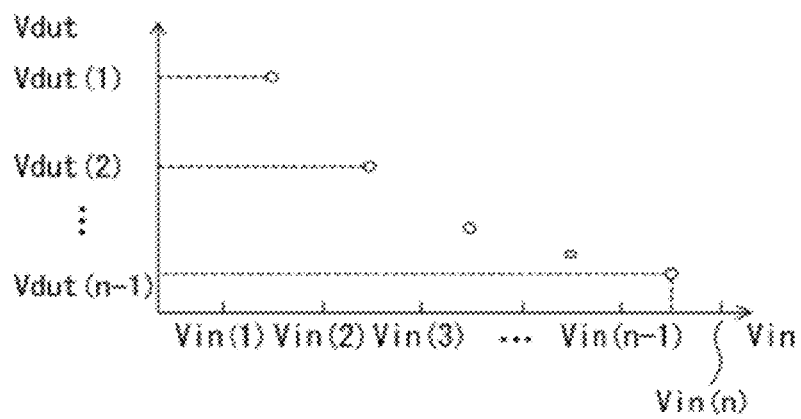

The measurement system performs the same processes as those of S1-S3 for each of the input amplitude sections. Then, in S11-S13, the measurement system finally inputs the data signal in which "input amplitude=(Vin(n-1)+Vin(n))/2" is applicable to the optical transmitter 10. The measurement system stores the Vdut obtained for the data signal in memory area n-1 as Vdut(n-1). In other words, the Vdut(n-1) illustrated in FIG. 10C is detected and stored in the memory area n-1 of the crosspoint control voltage table.

In the procedure described above, the crosspoint control voltage table of FIG. 8 is created. Then, the crosspoint control voltage table is stored in the memory 18 which is provided for the controller 16.

Figure 11:
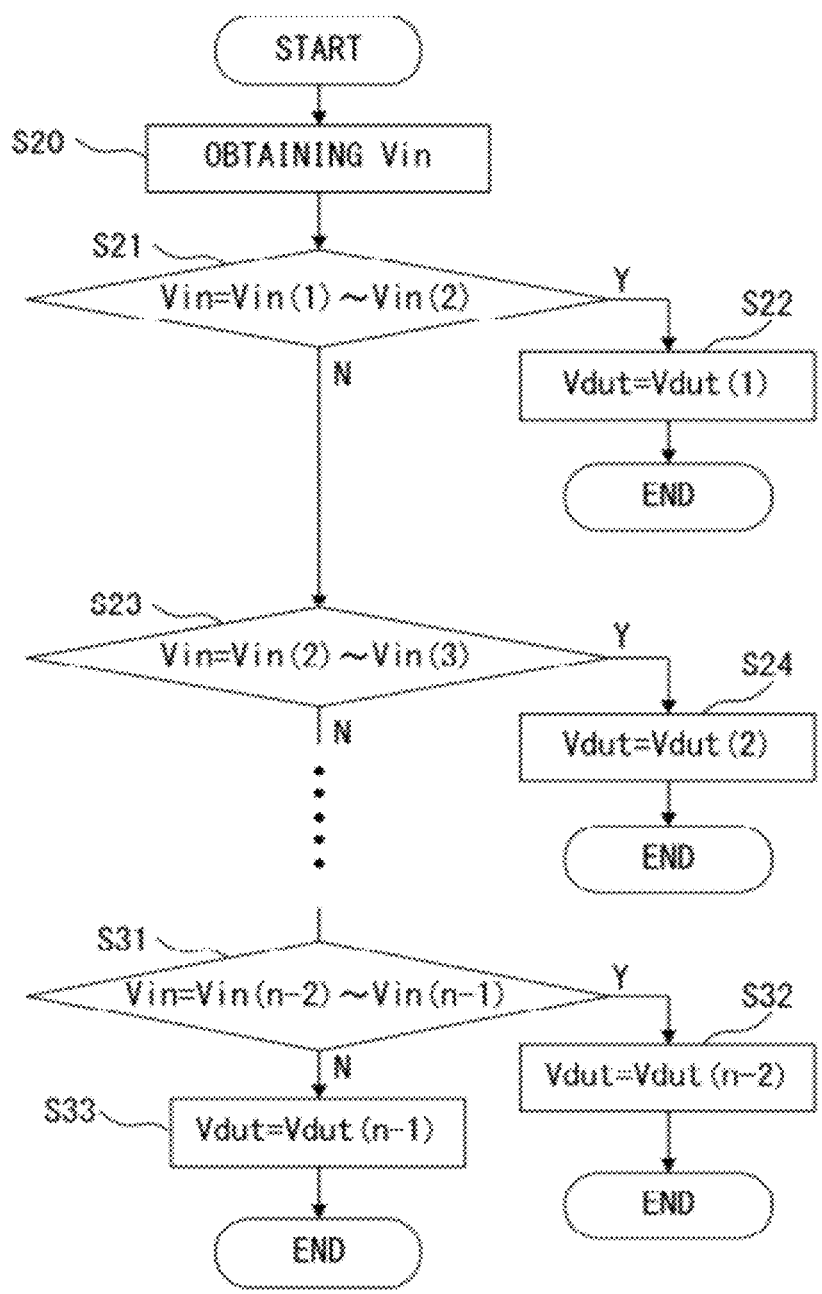
FIG. 11 is a flowchart illustrating a method for determining a crosspoint control voltage according to the first embodiment.

FIG. 11 is a flowchart illustrating a method for determining a crosspoint control voltage according to the first embodiment. The processes in the flowchart are executed by the controller 16. Note that the amplitude detector 15 detects the input amplitude at all times. Moreover, the controller 16 repeats, for example, the processes of the flowchart.

In S20, the controller 16 obtains the input amplitude Vin detected by the amplitude detector 15. In S21, the controller 16 determines whether or not the input amplitude Vin is within the range of input amplitude section Vin(1)-Vin(2). In other words, it is determined whether "Vin(1)≤Vin<Vin(2)" is applicable or not. When this condition is satisfied, in S22, the controller 16 obtains the crosspoint control voltage Vdut(1) which corresponds to the input amplitude section Vin(1)-Vin(2) from the crosspoint control voltage table. Then, the controller 16 generates the crosspoint control voltage Vdut(1) and provides it to the modulator driver 12.

When the input amplitude Vin is equal to or larger than the Vin(2), in S23, the controller 16 determines whether or not the input amplitude Vin is within the range of input amplitude section Vin(2)-Vin(3). In other words, it is determined whether "Vin(2)≤Vin<Vin(3)" is applicable or not. When this condition is satisfied, in S24, the controller 16 obtains the crosspoint control voltage Vdut(2) which corresponds to the input amplitude section Vin(2)-Vin(3) from the crosspoint control voltage table. Then, the controller 16 generates the crosspoint control voltage Vdut(2) and provides it to the modulator driver 12.

As described above, the controller 16 searches for the input amplitude sections to which the input amplitude Vin belongs, and when such section is found, the controller 16 generates the corresponding crosspoint control voltage Vdut. Then, in S31-S33, it is determined whether "Vin(n-2)≤Vin<Vin(n-1)" is applicable or not, and the corresponding crosspoint control voltage Vdut is generated in accordance with the determination result.

The controller 16 provides to the modulator driver 12 the crosspoint control voltage which is generated as above. Then, the modulator driver 12 controls the crosspoints of the drive signal according to the crosspoint control voltage Vdut given by the controller 16. Here, the crosspoint control voltage Vdut given by the controller 16 is determined such that the crosspoints of the output optical signal waveform of the modulator 14 will be optimized or approximately optimized. Accordingly, if the modulator driver 12 generates a drive signal in accordance with the crosspoint control voltage Vdut, it is possible for the modulator 14 to generate a modulated optical signal of a favorable waveform.

As described above, according to the optical transmitter or the method for optical signal waveform compensation of the present embodiment, the waveform of the drive signal is controlled according to the input amplitude, and thus the deterioration of the output optical signal waveform due to the fluctuations in input amplitude is compensated for. As a result, a stable coding error feature is achieved even in the long distance transmission. Moreover, the configuration of the present embodiment does not require including an interface circuit which adjusts the input amplitude, and thus the reduction in size and power consumption of the optical transmitter is achieved. Furthermore, the output optical signal waveform in response to the fluctuations in input amplitude is stable, and thus the acceptable variations in the length of signal line of the electric signal in a transmitter including an optical transmitter become large. Accordingly, it is possible to increase the number of optical transmitters which can be installed in a transmitter.

Second Embodiment

In the first embodiment, the crosspoint control voltage Vdut with respect to the input amplitude Vin can be obtained by performing a measurement. Here, there is a certain relationship between the input amplitude Vin and the crosspoint control voltage Vdut. For example, when the modulator 14 is an EA modulator, it is possible to express the relationship between the input amplitude Vin and the crosspoint control voltage Vdut by a quadratic function in an approximation.

Figure 12:
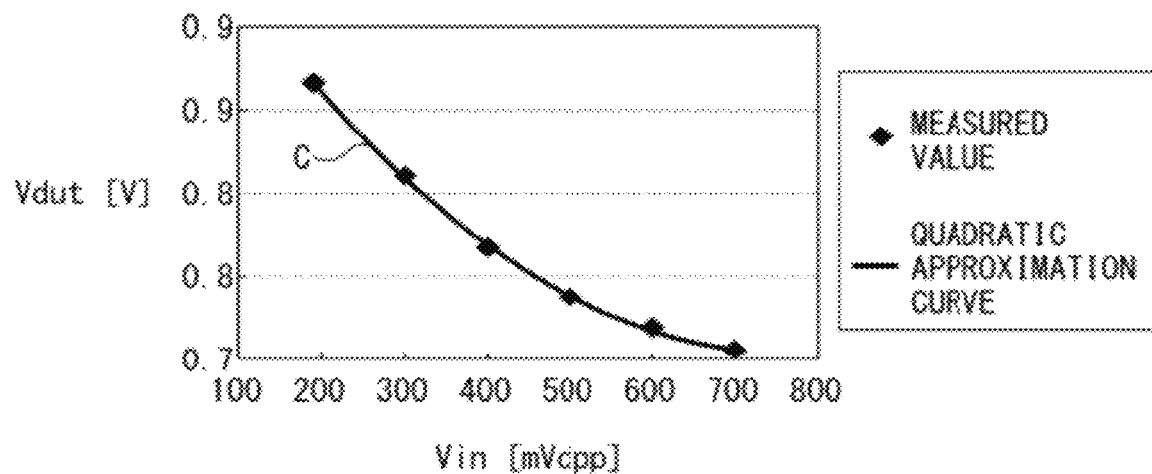
FIG. 12 is a diagram illustrating a quadratic approximation curve.

FIG. 12 is a diagram illustrating a quadratic approximation curve. In FIG. 12, the modulator 14 is an EA modulator. The crosspoint control voltage Vdut with which "Xpoint=target Xpoint" is applicable is measured for "amplitude Vin=190-700 mVpp", and each measurement result is plotted. A target Xpoint indicates, for example, the state in which the crosspoints of the output optical signal waveform are positioned at the middle of the H-level and L-level of the output optical signal waveform. A curve C is a quadratic approximation curve which is drawn for the plotted points.

As illustrated in FIG. 12, the curve C very precisely expresses the tendency of a plurality of plots which are obtained in the measurement. In other words, a quadratic approximation curve very precisely expresses the tendency of the relationship between the input amplitude Vin and crosspoint control voltage Vdut of an EA modulator.

A quadratic approximation curve for the input amplitude Vin can be expressed by equation (1) below.

$$Vdut = a \cdot Vin^2 + b \cdot Vin + c \quad (1)$$

Accordingly, if the coefficients "a" and "b" and the constant "c" are determined, the crosspoint control voltage Vdut with which a target Xpoint is obtained can be calculated for the input amplitude Vin which is detected by the amplitude detector 15.

Figure 13:
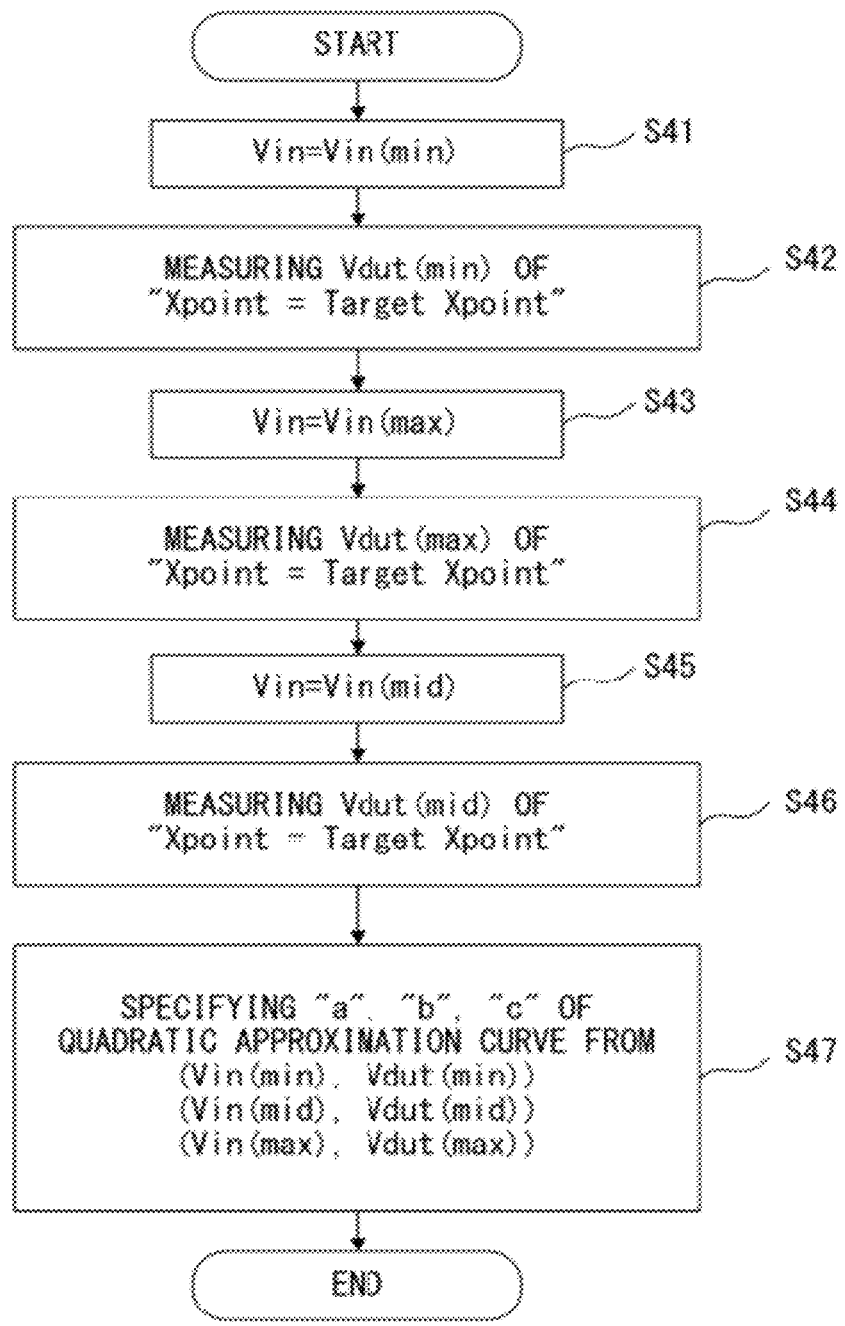
FIG. 13 is a flowchart illustrating a method for determining a function used in the second embodiment.

FIG. 13 is a flowchart illustrating a method for determining a function used in the second embodiment. The procedure of the flowchart is performed, for example, by the above described measurement system. Alternatively, a user may manually perform the procedure. In the following descriptions, it is assumed that the measurement system performs the procedure of FIG. 13.

In S41, the measurement system inputs the data signal in which "input amplitude=Vin(min)" is applicable to the optical transmitter 10. The Vin(min) represents the minimum input amplitude which is defined for the input signal to the optical transmitter 10. In S42, the measurement system measures a value of the crosspoint control voltage (Vdut(min)) with which "Xpoint=target Xpoint" is obtained, for example, by sweeping the crosspoint control voltage Vdut. In other words, as illustrated in FIG. 14, the crosspoint control voltage Vdut(min) corresponding to the input amplitude Vin(min) is measured.

In S43, the measurement system inputs the data signal in which "input amplitude=Vin(max)" is applicable to the optical transmitter 10. The Vin(max) represents the maximum input amplitude which is defined for the input signal to the optical transmitter 10. In S44, the measurement system measures a value of the crosspoint control voltage (Vdut(max)) with which "Xpoint=target Xpoint" is obtained in a similar manner to S42. In other words, as illustrated in FIG. 14, the crosspoint control voltage Vdut(max) corresponding to the input amplitude Vin(max) is measured.

In S45, the measurement system inputs the data signal in which "input amplitude=Vin(mid)" is applicable to the optical transmitter 10. The Vin(mid) represents, for example, an average of the Vin(min) and Vin(max). In S46, the measurement system measures a value of the crosspoint control voltage (Vdut(mid)) with which "Xpoint=target Xpoint" is obtained in a similar manner to S42. In other words, as illustrated in FIG. 14, the crosspoint control voltage Vdut(mid) corresponding to the input amplitude Vin(mid) is measured.

Figure 14:
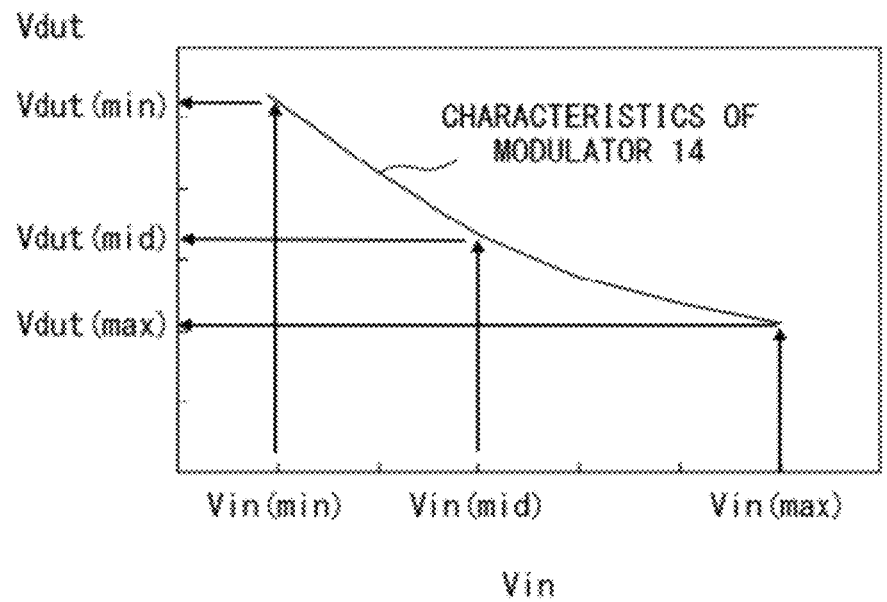
FIG. 14 is a diagram illustrating a method for determining a function used in the second embodiment.

In S47, the measurement system specifies in the coordinate systems of FIG. 14 a quadratic approximation curve from the three coordinates of (Vin(min), Vdut(min)), (Vin(mid), Vdut (mid)), and (Vin(max), Vdut(max)) which represent the measurement results of S42, S44, and S46, respectively. As a result, the coefficients "a" and "b" and the constant "c" of the equation (1) are calculated.

In the above-described example, crosspoint control voltage Vdut is calculated for each of the minimum input amplitude Vin(min), maximum input amplitude Vin(max), and medium input amplitude Vin(mid). However, the second embodiment is not limited to such a configuration. In other words, in order to determine a quadratic approximation curve in the method for optical signal waveform compensation according to the second embodiment, crosspoint control voltage Vdut should be measured for each of any three or more levels of input amplitude.

Figure 15:
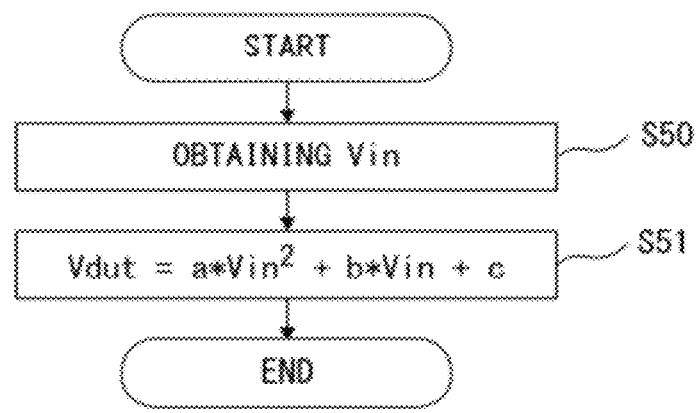
FIG. 15 is a flowchart illustrating a method for calculating a crosspoint control voltage according to the second embodiment.

FIG. 15 is a flowchart illustrating a method for calculating crosspoint control voltage according to the second embodiment. The processes in the flowchart are executed by the controller 16. Note that the amplitude detector 15 detects the input amplitude at all times. Moreover, the controller 16 repeats the processes of the flowchart.

In S50, the controller 16 obtains the input amplitude Vin detected by the amplitude detector 15. In S51, the controller 16 calculates the crosspoint control voltage Vdut which corresponds to the input amplitude Vin by using the equation (1) above. Next, the controller 16 generates the crosspoint control voltage Vdut indicated in the calculation result to provide the generated crosspoint control voltage Vdut to the modulator driver 12. Then, the modulator driver 12 controls the crosspoints of the drive signal according to the crosspoint control voltage Vdut given by the controller 16. Accordingly, also according to the second embodiment, it is possible for the modulator 14 to generate a modulated optical signal of a favorable waveform.

In the optical transmitter and the method for optical signal waveform compensation according to the second embodiment, it is not necessary for the controller 16 to include a crosspoint control voltage table. For this reason, it is possible to reduce in size the memory 18. Moreover, the process of calculating the crosspoint control voltage Vdut in S51 is requires a smaller amount of computation compared with the processes of the flowchart of FIG. 11. Further, it is possible to obtain an advantageous effect equivalent to that of the first embodiment according to the optical transmitter and the method for optical signal waveform compensation according to the second embodiment.

In an optical transmitter which includes an EA modulator, the relationship between the input amplitude Vin, the crosspoint control voltage Vdut, and the position of the crosspoints of the output optical signal waveform Xpoint is dependent on the control element of a driver (gain, circuit offset, saturation voltage or the like) and the extinction characteristic of the EA modulator, and thus the relationship is very complex. For this reason, it is difficult to logically derive the arithmetic expression which indicates the above-mentioned relationship, and a preferred simulation model has not been developed either. Under such circumstances, in the method for optical signal waveform compensation according to the present embodiment, a simple arithmetic expression in which the crosspoint control voltage Vdut with which a target Xpoint is obtained is calculated for any input amplitude Vin is derived by means of an approximation based on the measurement.

Third Embodiment

In the second embodiment, a function for calculating the crosspoint control voltage Vdut is determined for a certain target Xpoint. On the other hand, in the third embodiment, a function is provided which is capable of calculating the crosspoint control voltage Vdut with respect to any target Xpoint.

FIG. 16 is a diagram illustrating the relationship between the crosspoint control voltage Vdut and a position of the crosspoint of the output optical signal waveform. In FIG. 16, the input amplitude Vin is constant. The position of the crosspoints (Xpoint) of the output optical signal waveform is measured for "crosspoint control voltage Vdut=0.5-1.1V", and the measurement results are plotted. The Xpoint represents the ratio with respect to the amplitude or wave height of the output optical signal waveform. For example, "Xpoint=50 percent" indicates the state in which a crosspoint is positioned at the middle of the H-level and L-level of the output optical signal waveform. Note that the line L is a simple approximation line drawn for the plotted points.

As illustrated in FIG. 16, the line L precisely expresses the tendency of a plurality of plots which are obtained in the measurement. In other words, the crosspoint Xpoint of the output optical signal waveform varies almost linearly with respect to the crosspoint control voltage Vdut.

Figure 17:
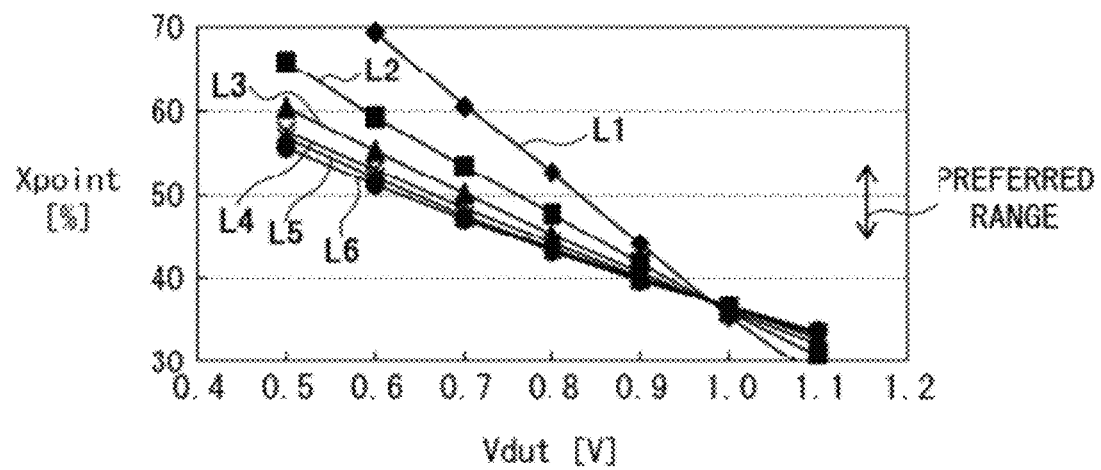
FIG. 17 is a diagram illustrating the input amplitude dependence of the slope of Xpoint against Vdut.

FIG. 17 is a diagram illustrating the input amplitude dependence of the slope of Xpoints against Vdut. In FIG. 17, the position of the crosspoint Xpoints against the crosspoint control voltage Vdut are measured in "input amplitude Vin=190-700 mVpp". The lines L1-L6 are simple approximation lines of the measurement results obtained for "Vin=190, 300, 400, 500, 600, 700 mVpp", respectively.

As illustrated in FIG. 17, when the input amplitude Vin is small, the slope of the Xpoints against the Vdut is large. On the other hand, when the input amplitude Vin is large, the slope of the Xpoints against the Vdut is small. Note that the lines L1-L6 intersect at almost the same coordinates in the coordinate systems of FIG. 17.

As described above, according to the measurement results illustrated in FIG. 17, the slope of the Xpoints against the Vdut is dependent on the input amplitude Vin. Accordingly, if the reciprocal of the slope of the Xpoints against the Vdut is obtained, it is possible to calculate the crosspoint control voltage with which the target Xpoint is obtained for any input amplitude Vin. In other words, if the input amplitude Vin is detected by using the amplitude detector 15, it is possible to calculate the crosspoint control voltage with which the target Xpoint is obtained. In the following description, the reciprocal of the slope of the Xpoints against the Vdut will be referred to as "slop$^{-1}$".

FIG. 18 is a diagram illustrating slope$^{-1}$ against the input amplitude Vin. In FIG. 18, the reciprocal slop$^{-1}$ of the slope is plotted in "input amplitude Vin=190-700 mVpp". The reciprocal slop$^{-1}$ of the slope is obtained by measuring the Xpoints while changing the Vdut for each level of the input amplitude. Moreover, the curve S is a quadratic approximation curve drawn for the plotted points.

As illustrated in FIG. 18, the curve S quite precisely expresses the tendency of a plurality of plots which are obtained in the measurement. In other words, a quadratic approximation curve quite precisely expresses the tendency of the relationship between the input amplitude Vin and the reciprocal slop$^{-1}$ of the slope.

A quadratic approximation curve for the input amplitude Vin is expressed in the equation (2) below.

$$\text{slop}^{-1} = d \cdot Vin^2 + e \cdot Vin + f \quad (2)$$

Accordingly, if the coefficients "d" and "e" and the constant "f" are determined, the reciprocal slop$^{-1}$ of the slope corresponding to the input amplitude Vin which is detected by the amplitude detector 15 can be calculated.

Further, the reciprocal slop$^{-1}$ of the slope may be used to express the crosspoint control voltage Vdut as in equation (3) below.

$$Vdut = (Xp - g) \cdot \text{slop}^{-1} + h \quad (3)$$

"Xp" indicates a target position of the crosspoint of the output optical signal waveform. Accordingly, if the constant "g" and "h" is determined, it is possible to calculate the crosspoint control voltage Vdut with which the target crosspoint position is obtained.

FIG. 19 is a flowchart illustrating a method for determining a function to be used in the third embodiment. The procedure of the flowchart is performed, for example, by the measurement system. Alternatively, a user may manually perform the procedure. In the following descriptions, it is assumed that the measurement system performs the procedure of FIG. 19.

Figure 20A:
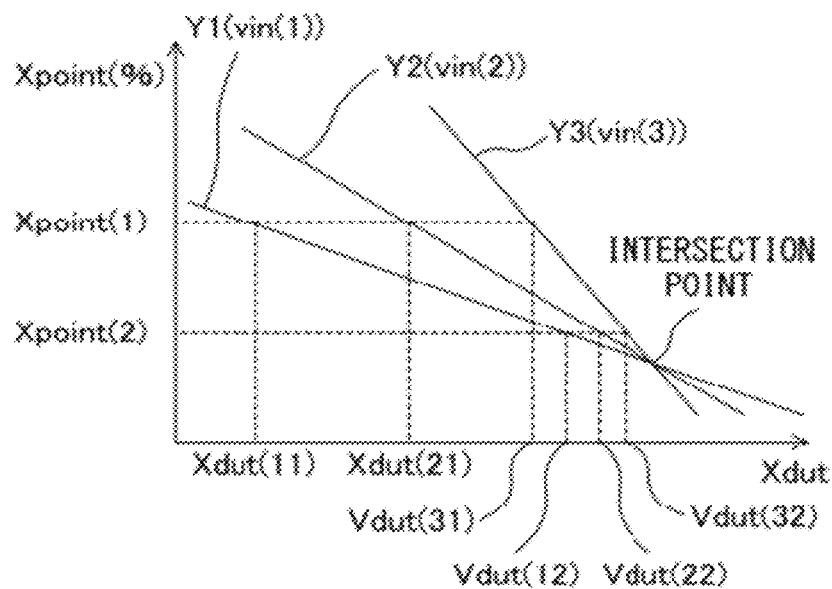
FIGS. 20A and 20B are diagrams illustrating a method for determining a function used in the third embodiment.

In S61, the measurement system inputs the data signal in which "input amplitude=Vin(1)" is applicable to the optical transmitter 10. "Vin(1)" is, for example, the maximum input amplitude Vin(max) described in the second embodiment. In S62, the measurement system obtains the crosspoint control voltage Vdut(11) with which "Xpoint=Xpoint(1)" is applicable by performing a measurement. In S63, the measurement system obtains the crosspoint control voltage Vdut(12) with which "Xpoint=Xpoint(2)" is applicable by performing a measurement. In other words, as illustrated in FIG. 20A, the measurement system detects the crosspoint control voltage Vdut(11), Vdut(12) with which crosspoints Xpoint(1) and Xpoint(2) are respectively obtained with respect to the input amplitude Vin(1).

It is preferred for Xpoint(1) and Xpoint(2) to have values which are not in close proximity to each other. This should not be interpreted in a limited sense, but for example, Xpoint(1) can have a value larger than 50 percent while Xpoint(2) has a value smaller than 50 percent.

In S64, the measurement system inputs the data signal in which "input amplitude=Vin(2)" is applicable to the optical transmitter 10. "Vin(2)" is, for example, a medium input amplitude Vin(mid) described in the second embodiment. In S65, the measurement system obtains the crosspoint control voltage Vdut(21) with which "Xpoint=Xpoint(1)" is applicable by performing a measurement. In S66, the measurement system obtains the crosspoint control voltage Vdut(22) with which "Xpoint=Xpoint(2)" is applicable by performing a measurement. In other words, as illustrated in FIG. 20A, the measurement system detects crosspoint control voltage Vdut (21) and Vdut(22) with which the crosspoint Xpoint(1) and Xpoint(2) are respectively obtained with respect to the input amplitude Vin(2).

In S67, the measurement system inputs the data signal in which "input amplitude=Vin(3)" is applicable to the optical transmitter 10. "Vin(3)" is, for example, the minimum input amplitude Vin(min) described in the second embodiment. In S68, the measurement system obtains the crosspoint control voltage Vdut(31) with which "Xpoint=Xpoint(1)" is applicable by performing a measurement. In S69, the measurement system obtains crosspoint control voltage Vdut(32) with which "Xpoint=Xpoint(2)" is applicable by performing a measurement. In other words, as illustrated in FIG. 20A, the measurement system detects crosspoint control voltage Vdut (31) and Vdut(32) with which crosspoints Xpoint(1) and Xpoint(2) are respectively obtained with respect to the input amplitude Vin(3).

In S70, the measurement system specifies a line Y1 which passes through the following two coordinates obtained in S61-S63, in the coordinate systems of FIG. 20A.
(Vdut(11), Xpoint(1))
(Vdut(12), Xpoint(2))
Then, the measurement system calculates the reciprocal slope $(1)^{-1}$ of the slope of the line Y1.

In S71, the measurement system specifies a line Y2 which passes through the following two coordinates obtained in S64-S66.
(Vdut(21), Xpoint(1))
(Vdut(22), Xpoint(2))
Then, the measurement system calculates the reciprocal slope $(2)^{-1}$ of the slope of the line Y2.

In S72, the measurement system specifies a line Y3 which passes through the following two coordinates obtained in S67-S69.
(Vdut(31), Xpoint(1))
(Vdut(32), Xpoint(2))
Then, the measurement system calculates the reciprocal slope $(3)^{-1}$ of the slope of the line Y3. As described above, in S70-S72, as illustrated in FIG. 20B, the reciprocals slope $(1)^{-1}$, slope$(2)^{-1}$, and slope$(3)^{-1}$ of the slopes are calculated for the input amplitude Vin(1), Vin(2), and Vin(3), respectively.

In S73, the measurement system calculates the coordinates of the intersection point of lines Y1 and Y3 in the coordinate systems of FIG. 20A. The coordinate of the intersection point on the Vdut axis is specified as the constant "h" in the equation (3) above. Moreover, the coordinate of the intersection point on the Xpoint axis is specified as the constant "g" in equation (3) above.

Figure 20B:
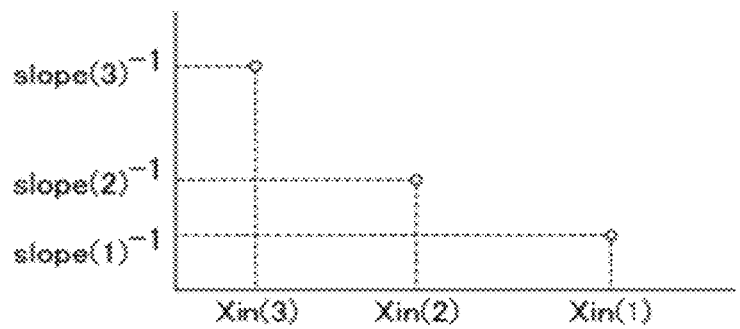

In S74, the measurement system specifies quadratic approximation curves from the following three coordinates in the coordinate systems of FIG. 20B.
(Vin(1), slope$(1)^{-1}$)
(Vin(2), slope$(2)^{-1}$)
(Vin(3), slope$(3)^{-1}$)
As a result, the coefficients "d" and "e" and the constant "f" in equation (2) above are determined.

As described above, equations (2) and (3) are specified by the processes of S61-S74. Note that the measurement system may not execute S61-S74 in the order illustrated in FIG. 19. For example, it is possible for S70 to be executed subsequent to the execution of S61-S63, S71 to be executed subsequent to the execution of S64-S66, and S72 to be executed subsequent to the execution of S67-S69. Moreover, S74 may be executed before the execution of S73.

Figure 21:
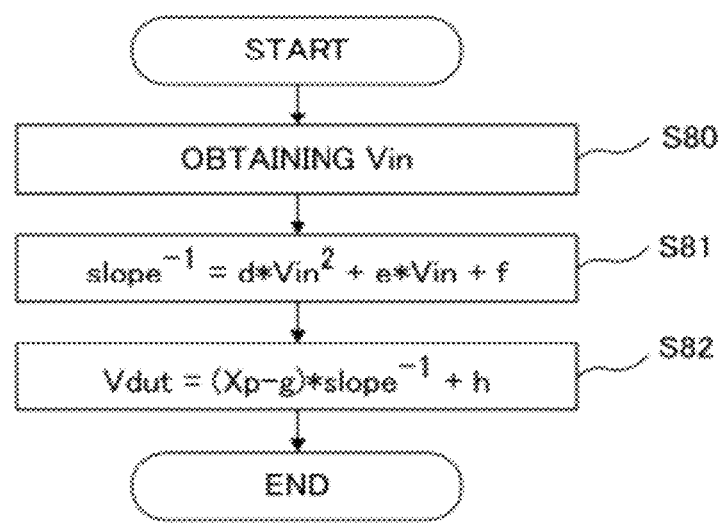
FIG. 21 is a flowchart illustrating a method for calculating a crosspoint control voltage according to the third embodiment.

FIG. 21 is a flowchart illustrating a method for calculating a crosspoint control voltage according to the third embodiment. The processes of the flowchart are executed by the controller 16. Note that the amplitude detector 15 detects the input amplitude at all times. Moreover, the controller 16 repeats, for example, the processes of the flowchart.

In S80, the controller 16 obtains the input amplitude Vin detected by the amplitude detector 15. In S81, the controller 16 calculates the reciprocal slope$^{-1}$ of the slope which corresponds to the input amplitude Vin by using the equation (2) above. In S82, the controller 16 calculates the crosspoint control voltage Vdut by using the reciprocal slope$^{-1}$ of the slope obtained in S81. Here, "Xp" in equation (3) above indicates a target crosspoint position of the output optical signal waveform. The controller 16 generates the crosspoint control voltage Vdut according to the calculation result to provide the generated crosspoint control voltage Vdut to the modulator driver 12. Then, the modulator driver 12 controls the crosspoints of the drive signal according to the crosspoint control voltage Vdut given by the controller 16. Accordingly, also in the third embodiment, it is possible for the modulator 14 to generate a modulated optical signal of a favorable waveform.

In a similar manner to the second embodiment, in the optical transmitter and the method for optical signal waveform compensation according to the third embodiment, it is not necessary for the controller 16 to include a crosspoint control voltage table. For this reason, it is possible to reduce the memory 18 in size. Moreover, the process of calculating the crosspoint control voltage Vdut in S81-S82 requires a smaller amount of computation compared with the processes of the flowchart of FIG. 11.

Furthermore, in the optical transmitter and the method for optical signal waveform compensation according to the third embodiment, the crosspoint control voltage Vdut is controlled according to the input amplitude Vin so as to obtain a target Xp in the equation (3) above, and thereby a modulated optical signal having the target Xp is generated. In other words, even if the demand for the output optical signal waveform is changed, it is possible to satisfy the demand by merely updating the target Xp in the equation (3). For example, when the target Xp is changed from 50 percent to 52 percent, the value of Xp in equation (3) above described in an optical signal waveform compensation program is rewritten from "50" to "52". Accordingly, it is possible to flexibly deal with a change or the like in the design or specifications of the optical transmitter.

Measurement Result

Some measurement results relating to the characteristics of an optical transmitter are illustrated in FIGS. 22A, 22B, and 23A-23C. Here, cases in which a method for optical signal waveform compensation is performed are compared with cases in which the method is not performed at input amplitude 190-700 mVpp of the optical transmitter 10. Note that the above-described method according to the third embodiment is adopted in the compensation of an optical signal waveform.

FIG. 22A illustrates results of measuring Xpoints which are positions of the crosspoint of the output optical signal waveform. When waveform compensation is not performed, Xpoints largely change in regions of small input amplitude Vin, thereby distorting the optical signal waveform. In contrast, when waveform compensation according to the embodiment is performed, Xpoints remain approximately constant even when input amplitude Vin varies.

FIG. 22B illustrates results of measuring the mask margin of the output optical signal waveform. When waveform compensation is not performed, the mask margin degrades in regions of small input amplitude Vin. In contrast, when waveform compensation according to the embodiment is performed, the fluctuation in mask margin is small even when input amplitude Vin varies.

Figure 23A:
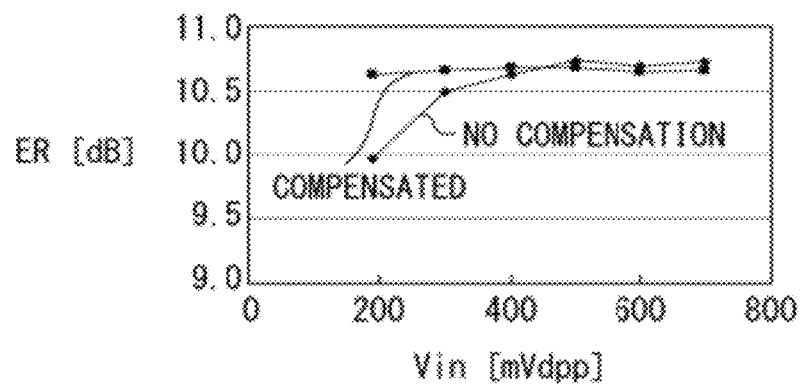

FIG. 23A illustrates results of measuring the extinction ratio (ER) of the output optical signal waveform. When waveform compensation is not performed, the extinction ratio degrades in regions of small input amplitude Vin. In contrast, when waveform compensation according to the embodiment is performed, the extinction ratio remains almost constant even when input amplitude Vin varies.

Figure 23B:
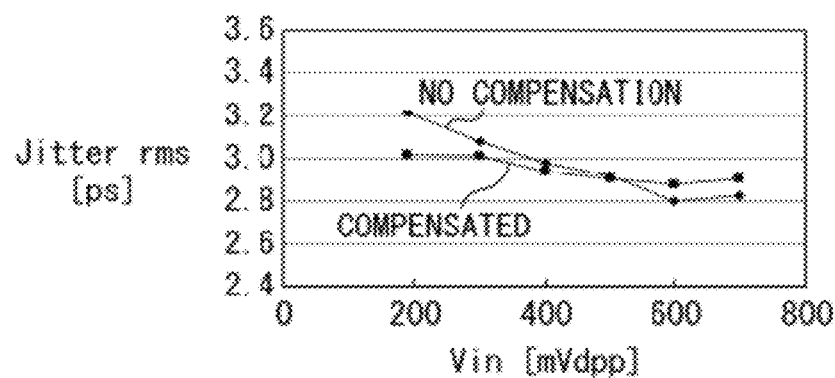

FIG. 23B illustrates results of measuring the jitter of the output optical signal waveform. When waveform compensation is not performed, the changes in jitter become large when the input amplitude Vin changes. In contrast, when waveform compensation according to the embodiment is performed, the changes in jitter become small with respect to input amplitude Vin.

Figure 23C:
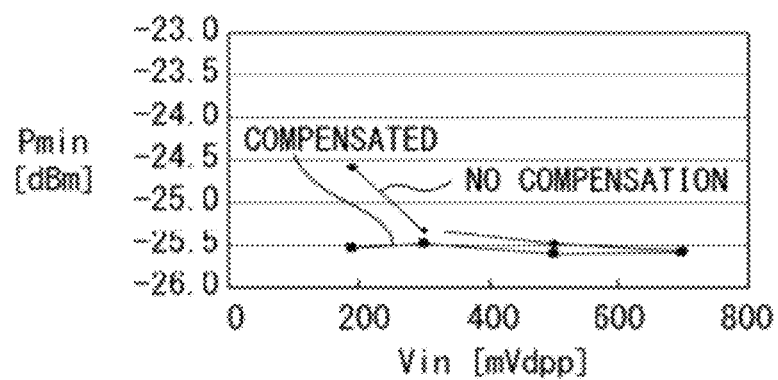

FIG. 23C illustrates results of measuring the minimum receiver sensitivity. Note that the measurement is performed on the condition that the distance of transmission between an optical transmitter and an optical receiver is zero (i.e., Back-to-Back). When waveform compensation is not performed, the minimum receiver sensitivity degrades in regions of small input amplitude Vin. In contrast, when waveform compensation according to the embodiment is performed, the minimum receiver sensitivity remains almost constant even when input amplitude Vin varies.

FIG. 24 is a diagram illustrating the output optical signal waveform obtained in measurement. If waveform compensation is not performed, the output optical signal waveform largely changes for the changes in input amplitude Vin. In contrast, when waveform compensation according to the embodiment is performed, the changes in output optical signal waveform are small even when the input amplitude Vin fluctuates.

Variation

As an example of the amplitude detector 15, the configuration of FIG. 7B has been described. However, the amplitude detector 15 may be realized in a different configuration. Some variations of the amplitude detector 15 will be described with reference to FIGS. 25A-25C and 26A-26C.

Figure 25A:
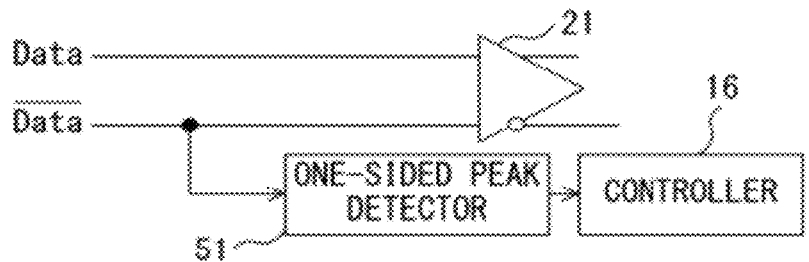
FIGS. 25A-25C and 26A-26C are diagrams illustrating variations of an amplitude detector.

The amplitude detector of FIG. 25A has a one-side peak detector 51. The one-side peak detector 51 is realized by an H-side peak detector or an L-side peak detector. The H-side peak detector is realized, for example, by the circuit illustrated in FIG. 7B. The L-side peak detector is realized, for example, by reversing the direction of the diode D in the circuit of FIG. 7B. In other words, the L-side peak detector is realized by guiding the output signal from the buffer amplifier 42 to the cathode of the diode D and electrically connecting the anode of the diode D to the capacitor C in FIG. 7B.

Figure 25B:
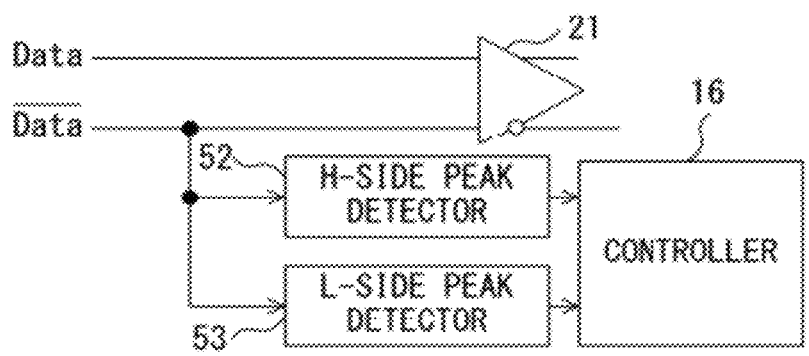

The amplitude detector of FIG. 25B has an H-side peak detector 52 and an L-side peak detector 53. The H-side peak detector 52 and the L-side peak detector 53 are configured as described above. In this case, the controller 16 calculates the input amplitude Vin according to the amplitude information obtained by the H-side peak detector 52 and the L-side peak detector 53.

Figure 25C:
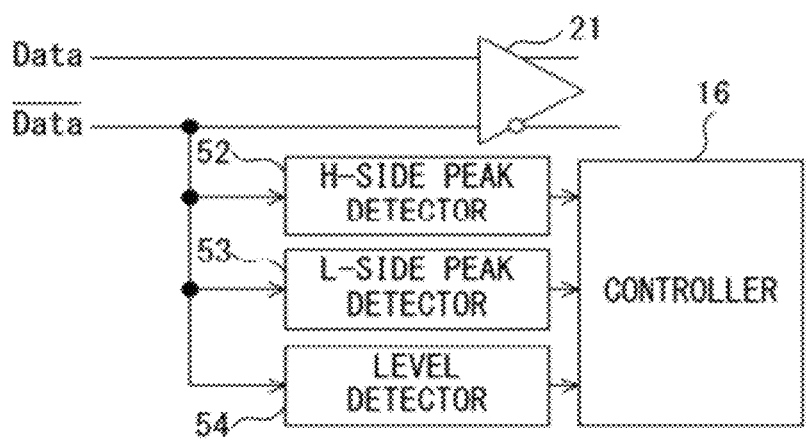

The amplitude detector of FIG. 25C has the H-side peak detector 52, the L-side peak detector 53, and a level detector 54. In this case, the controller 16 calculates the input amplitude Vin by correcting the amplitude information obtained by the H-side peak detector 52 and the L-side peak detector 53 with the level information obtained by the level detector 54.

Figure 26A:
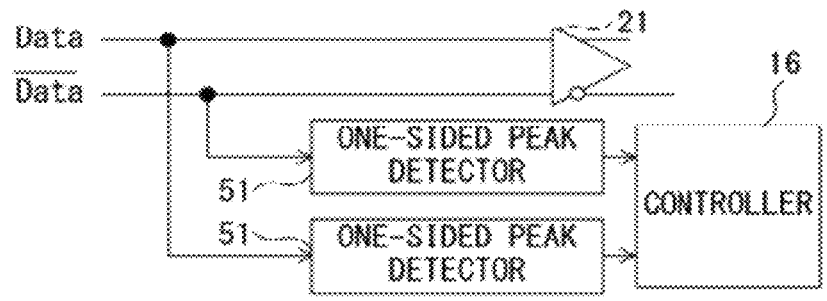

The amplitude detector of FIG. 26A has a respective one-side peak detector 51 for the non-inverted input signal and the inverted input signal. In this case, the controller 16 calculates the input amplitude Vin by using the amplitude information obtained by the one-side peak detectors 51 on both sides.

Figure 26B:
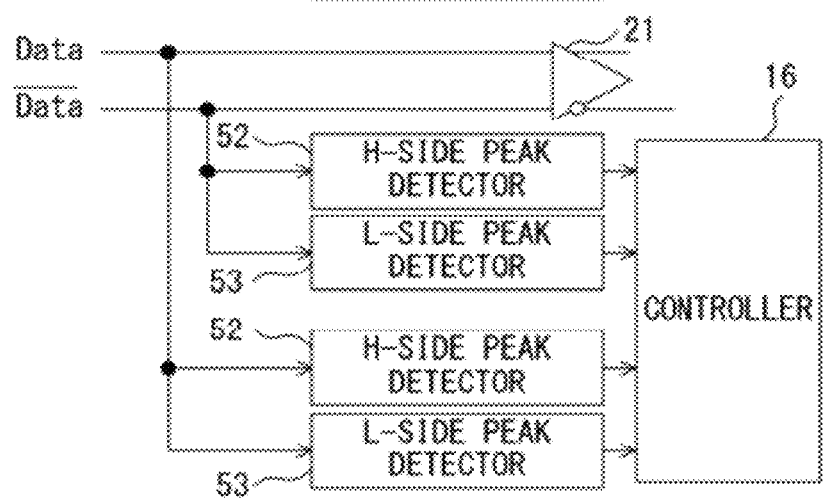
Figure 26C:
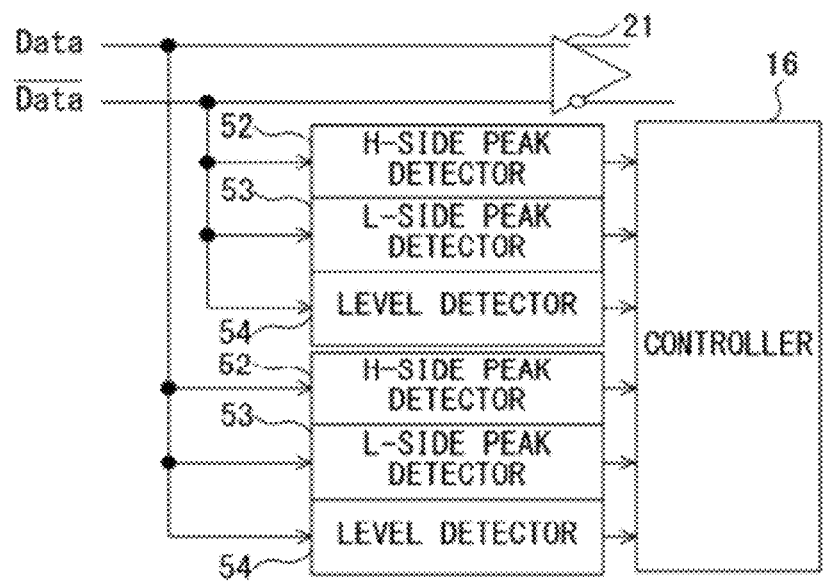

The amplitude detector of FIG. 26B has the configuration of FIG. 25B (H-side peak detector 52, L-side peak detector 53) respectively for the non-inverted input signal and the inverted input signal. In a similar manner, the amplitude detector of FIG. 26C has the configuration of FIG. 25C (H-side peak detector 52, L-side peak detector 53, level detector 54) respectively for the non-inverted input signal and the inverted input signal.

In the above-described embodiment, an EA modulator is described as an example of the modulator 14. However, an optical transmitter according to the embodiments is not limited to such a configuration. In other words, the optical transmitter according to the embodiments may be configured to include a modulator other than the EA modulator. In this case, the optical transmitter may be configured to implement a modulator in which the crosspoints of the drive signal are different from the crosspoints of the output optical signal waveform. Moreover, the optical transmitter may be configured to implement a modulator in which the optical output power has a nonlinear characteristic with respect to the voltage applied by the drive signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:
1. An optical transmitter, comprising:
a modulator driver configured to generate a drive signal from an input signal;
a modulator configured to generate a modulated optical signal according to the drive signal;
an amplitude detector configured to detect an input amplitude representative of an amplitude of the input signal; and
a controller configured to generate a crosspoint control voltage determined according to the input amplitude detected by the amplitude detector, wherein
the modulator driver controls a crosspoint of the drive signal according to the crosspoint control voltage.

2. The optical transmitter according to claim 1, wherein
the input signal is a differential signal which includes a first signal and a second signal, and
the modulator driver adjusts an offest between voltage levels of the first signal and the second signal according to the crosspoint control voltage.

3. The optical transmitter according to claim 1, further comprising
a memory configured to store crosspoint control data with which a desired output optical signal waveform is obtained by the modulator for input amplitude data representing the input amplitude, wherein
the controller uses the input amplitude data representing the input amplitude detected by the amplitude detector to obtain corresponding crosspoint control data from the memory, and generates the crosspoint control voltage according to the obtained crosspoint control data.

4. The optical transmitter according to claim 1, wherein
the controller uses an arithmetic expression for calculating a crosspoint control voltage with which a desired output optical signal waveform is obtained by the modulator for the input amplitude in order to generate the crosspoint control voltage corresponding to the input amplitude detected by the amplitude detector.

5. The optical transmitter according to claim 4, wherein
the modulator is an electroabsorption optical modulator, and
the arithmetic expression is a quadratic function of the input amplitude.

6. The optical transmitter according to claim 5, wherein
the quadratic function is determined by using a result of measuring a crosspoint control voltage with which a desired output optical signal waveform is obtained by the modulator for each of the three or more different input amplitudes.

7. The optical transmitter according to claim 4, wherein the modulator is an electroabsorption optical modulator, and the arithmetic expression includes a quadratic function of the input amplitude for calculating a reciprocal of a slope of changes in a crosspoint position of the output optical signal waveform with respect to the crosspoint control voltage, and a linear function of the reciprocal of a slope for calculating the crosspoint control voltage.

8. The optical transmitter according to claim 1, wherein the amplitude detector includes a peak detector to detect at least one of a peak on an H-level side and a peak on an L-level side of the input signal.

9. A method for optical signal waveform compensation, the method being used in an optical transmitter which includes a modulator driver to generate a drive signal from an input signal and a modulator to generate a modulated optical signal according to the drive signal, the method comprising:

detecting an amplitude of the input signal; and controlling a crosspoint of the drive signal according to the detected amplitude of the input signal to adjust a waveform of the modulated optical signal.

10. A method for optical signal generation, comprising:

detecting an amplitude of an input signal to an optical transmitter;

generating a crosspoint control voltage according to the detected amplitude of the input signal;

generating from the input signal a drive signal with which a crosspoint is controlled according to the crosspoint control voltage; and generating an optical signal according to the drive signal by using a modulator.

* * * * *